(12) United States Patent
Ramanujam et al.

(10) Patent No.: US 10,505,772 B2
(45) Date of Patent: Dec. 10, 2019

(54) NON-STAGGERED REFERENCE SIGNALS AND REPEATED PILOTS IN ORTHOGONAL FREQUENCY-DIVISION MULTIPLEXING

(71) Applicant: QUALCOMM Incorporated, San Diego, CA (US)

(72) Inventors: Sridhar Ramanujam, San Diego, CA (US); Xiaoxia Zhang, San Diego, CA (US); Taesang Yoo, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 15/614,317

(22) Filed: Jun. 5, 2017

(65) Prior Publication Data

US 2018/0115448 A1 Apr. 26, 2018

Related U.S. Application Data

(60) Provisional application No. 62/413,293, filed on Oct. 26, 2016.

(51) Int. Cl.
*H04L 27/26* (2006.01)
*H04J 3/06* (2006.01)
(Continued)

(52) U.S. Cl.
CPC ........ *H04L 27/2613* (2013.01); *H04J 3/0605* (2013.01); *H04L 5/005* (2013.01);
(Continued)

(58) Field of Classification Search
CPC ... H04L 5/0007; H04L 5/0016; H04L 5/0048; H04L 5/005; H04L 25/0202;
(Continued)

(56) References Cited

U.S. PATENT DOCUMENTS

2006/0209973 A1* 9/2006 Gorokhov ............. H04L 5/0048
375/260
2009/0296925 A1 12/2009 Kishiyama et al.
(Continued)

OTHER PUBLICATIONS

International Search Report and Written Opinion—PCT/US2017/056650—ISA/EPO—dated Feb. 9, 2018 (170208WO).

*Primary Examiner* — Benjamin H Elliott, IV
(74) *Attorney, Agent, or Firm* — Holland & Hart LLP

(57) ABSTRACT

Methods, systems, and devices for wireless communication are described. A wireless communications system may support techniques for using non-staggered reference signals to increase the efficiency of the system and reduce the complexity of channel estimation. A base station may schedule a transmission to a user equipment (UE) including pilot tones mapped to a first symbol and a second symbol. In some cases, the pilot tones on the first and second symbols may be non-contiguous, and the base station may scramble the pilot tones on the first and second symbols according to the same scrambling sequence. In other cases, the pilot tones on the first and second symbols may be contiguous, and the pilot tones may be scrambled according to the same or different scrambling sequences. These techniques may result in reduced complexity for interference estimation and channel estimation at a UE.

28 Claims, 17 Drawing Sheets

(51) Int. Cl.
*H04L 5/00* (2006.01)
*H04L 25/02* (2006.01)
*H04L 27/28* (2006.01)
*H04W 72/12* (2009.01)

(52) U.S. Cl.
CPC .......... *H04L 5/0007* (2013.01); *H04L 5/0016* (2013.01); *H04L 5/0048* (2013.01); *H04L 25/0202* (2013.01); *H04L 25/0236* (2013.01); *H04L 27/2611* (2013.01); *H04L 27/28* (2013.01); *H04W 72/121* (2013.01); *H04L 25/0224* (2013.01)

(58) Field of Classification Search
CPC ............. H04L 25/0236; H04L 27/2611; H04L 27/2613; H04L 27/28; H04J 3/0605; H04W 72/121
See application file for complete search history.

(56) References Cited

U.S. PATENT DOCUMENTS

| | | | |
|---|---|---|---|
| 2011/0110304 A1* | 5/2011 | Kuchi | H04L 5/0023 370/328 |
| 2012/0269142 A1* | 10/2012 | Porat | H04W 72/1231 370/329 |
| 2015/0078190 A1* | 3/2015 | Cheng | H04W 24/02 370/252 |
| 2016/0013908 A1* | 1/2016 | Porat | H04L 5/0048 370/210 |
| 2016/0192338 A1* | 6/2016 | Benjebbour | H04L 5/0023 370/330 |
| 2016/0233998 A1* | 8/2016 | Sun | H04L 5/0051 |
| 2016/0330000 A1* | 11/2016 | Lee | H04L 5/0007 |
| 2017/0019288 A1* | 1/2017 | Sagong | H04L 27/34 |
| 2018/0115448 A1* | 4/2018 | Ramanujam | H04J 3/0605 |

* cited by examiner

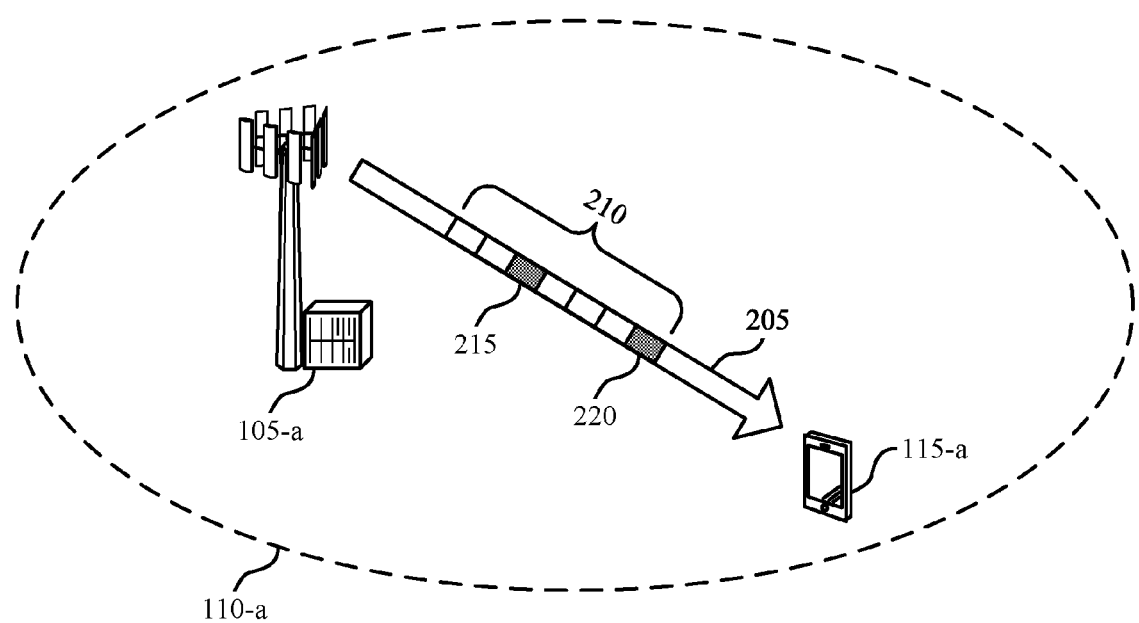
FIG. 2
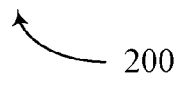

NON-STAGGERED REFERENCE SIGNALS AND REPEATED PILOTS IN ORTHOGONAL FREQUENCY-DIVISION MULTIPLEXING

CROSS REFERENCES

The present Application for Patent claims priority to U.S. Provisional Patent Application No. 62/413,293 by Ramanujam, et al., entitled "Non-Staggered Reference Signals and Repeated Pilots in OFDM," filed Oct. 26, 2016, assigned to the assignee hereof, and expressly incorporated by reference herein.

INTRODUCTION

The following relates generally to wireless communication and more specifically to non-staggered reference signals and repeated pilots in orthogonal frequency division multiplexing (OFDM).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

A wireless multiple-access communications system may include a number of base stations, each simultaneously supporting communication for multiple communication devices, which may be otherwise known as user equipment (UE). In some wireless systems, a base station may use pilot tones or reference signals to provide an amplitude and phase reference to a UE for use in channel estimation. The UE performs channel estimation to determine the correct amplitude and phase of a distorted data signal based on an amplitude and phase offset of pilot tones transmitted alongside the data signal.

In some examples, a base station may transmit staggered pilot tones to a UE to provide broader frequency coverage. That is, the base station may alternate the tone location on which a reference signal is transmitted in different symbols. However, in some cases, the use of staggered reference signals may result in increased complexity for channel estimation.

SUMMARY

A method of wireless communication is described. The method may include scheduling a transmission including a first set of pilot tones and a second set of pilot tones, transmitting a first pilot tone of the first set of pilot tones at a first tone location of a first symbol associated with a numerology, transmitting a second pilot tone of the first set of pilot tones at the first tone location of a second symbol associated with the numerology, transmitting a first pilot tone of the second set of pilot tones at a second tone location of the first symbol, and transmitting a second pilot tone of the second set of pilot tones at the second tone location of the second symbol, the first tone location and the second tone location being contiguous.

An apparatus for wireless communication is described. The apparatus may include means for scheduling a transmission including a first set of pilot tones and a second set of pilot tones, means for transmitting a first pilot tone of the first set of pilot tones at a first tone location of a first symbol associated with a numerology, means for transmitting a second pilot tone of the first set of pilot tones at the first tone location of a second symbol associated with the numerology, means for transmitting a first pilot tone of the second set of pilot tones at a second tone location of the first symbol, and means for transmitting a second pilot tone of the second set of pilot tones at the second tone location of the second symbol, the first tone location and the second tone location being contiguous.

Another apparatus for wireless communication is described. The apparatus may include a processor, memory in electronic communication with the processor, and instructions stored in the memory. The instructions may be operable to cause the processor to schedule a transmission including a first set of pilot tones and a second set of pilot tones, transmit a first pilot tone of the first set of pilot tones at a first tone location of a first symbol associated with a numerology, transmit a second pilot tone of the first set of pilot tones at the first tone location of a second symbol associated with the numerology, transmit a first pilot tone of the second set of pilot tones at a second tone location of the first symbol, and transmit a second pilot tone of the second set of pilot tones at the second tone location of the second symbol, the first tone location and the second tone location being contiguous.

A non-transitory computer readable medium for wireless communication is described. The non-transitory computer-readable medium may include instructions operable to cause a processor to schedule a transmission including a first set of pilot tones and a second set of pilot tones, transmit a first pilot tone of the first set of pilot tones at a first tone location of a first symbol associated with a numerology, transmit a second pilot tone of the first set of pilot tones at the first tone location of a second symbol associated with the numerology, transmit a first pilot tone of the second set of pilot tones at a second tone location of the first symbol, and transmit a second pilot tone of the second set of pilot tones at the second tone location of the second symbol, the first tone location and the second tone location being contiguous.

Some examples of the method, apparatus, and non-transitory computer-readable medium described above may further include processes, features, means, or instructions for identifying a first scrambling sequence associated with the transmission during the first symbol and a second scrambling sequence associated with the transmission during the second symbol. Some examples of the method, apparatus, and non-transitory computer-readable medium described above may further include processes, features, means, or instructions for scrambling the first set of pilot tones and the second set of pilot tones in the first symbol based at least in part on the first scrambling sequence, and scrambling the first set of pilot tones and the second set of pilot tones in the second symbol based at least in part on the second scrambling sequence.

In some examples of the method, apparatus, and non-transitory computer-readable medium described above, the first scrambling sequence and the second scrambling sequence may be the same. In some examples of the method, apparatus, and non-transitory computer-readable medium described above, the first scrambling sequence and the second scrambling sequence may be different.

In some examples of the method, apparatus, and non-transitory computer-readable medium described above, scheduling the transmission includes scheduling the transmission to span a single antenna. In some examples of the method, apparatus, and non-transitory computer-readable medium described above, the first set of pilot tones and the second set of pilot tones may be associated with the single antenna. In some examples of the method, apparatus, and non-transitory computer-readable medium described above, scheduling the transmission includes scheduling the transmission to span a plurality of antennas. In some examples of the method, apparatus, and non-transitory computer-readable medium described above, the first set of pilot tones may be associated with a first antenna of the plurality of antennas and the second set of pilot tones may be associated with a second antenna of the plurality of antennas.

In some examples of the method, apparatus, and non-transitory computer-readable medium described above, scheduling the transmission includes scheduling the transmission during the first symbol and the second symbol, where the first symbol and the second symbol may be non-adjacent symbols. In some examples of the method, apparatus, and non-transitory computer-readable medium described above, scheduling the transmission includes scheduling the transmission during the first symbol and the second symbol, where the first symbol and the second symbol may be within a same resource block.

A method of wireless communication is described. The method may include receiving a transmission including a first set of pilot tones and a second set of pilot tones during a first symbol associated with a numerology and a second symbol associated with the numerology, the first set of pilot tones received at a first set of tone locations and the second set of pilot tones received at a second set of tone locations, where a combination of the first set of tone locations and the second set of tone locations includes a contiguous set of tone locations and performing a channel estimation procedure based at least in part on the first set of pilot tones and the second set of pilot tones.

An apparatus for wireless communication is described. The apparatus may include means for receiving a transmission including a first set of pilot tones and a second set of pilot tones during a first symbol associated with a numerology and a second symbol associated with the numerology, the first set of pilot tones received at a first set of tone locations and the second set of pilot tones received at a second set of tone locations, where a combination of the first set of tone locations and the second set of tone locations includes a contiguous set of tone locations and means for performing a channel estimation procedure based at least in part on the first set of pilot tones and the second set of pilot tones.

Another apparatus for wireless communication is described. The apparatus may include a processor, memory in electronic communication with the processor, and instructions stored in the memory. The instructions may be operable to cause the processor to receive a transmission including a first set of pilot tones and a second set of pilot tones during a first symbol associated with a numerology and a second symbol associated with the numerology, the first set of pilot tones received at a first set of tone locations and the second set of pilot tones received at a second set of tone locations, where a combination of the first set of tone locations and the second set of tone locations includes a contiguous set of tone locations and perform a channel estimation procedure based at least in part on the first set of pilot tones and the second set of pilot tones.

A non-transitory computer readable medium for wireless communication is described. The non-transitory computer-readable medium may include instructions operable to cause a processor to receive a transmission including a first set of pilot tones and a second set of pilot tones during a first symbol associated with a numerology and a second symbol associated with the numerology, the first set of pilot tones received at a first set of tone locations and the second set of pilot tones received at a second set of tone locations, where a combination of the first set of tone locations and the second set of tone locations includes a contiguous set of tone locations and perform a channel estimation procedure based at least in part on the first set of pilot tones and the second set of pilot tones.

Some examples of the method, apparatus, and non-transitory computer-readable medium described above may further include processes, features, means, or instructions for identifying a first scrambling sequence associated with the transmission during the first symbol and a second scrambling sequence associated with the transmission during the second symbol. Some examples of the method, apparatus, and non-transitory computer-readable medium described above may further include processes, features, means, or instructions for descrambling the first set of pilot tones and the second set of pilot tones in the first symbol based at least in part on the first scrambling sequence, and descrambling the first set of pilot tones and the second set of pilot tones in the second symbol based at least in part on the second scrambling sequence.

In some examples of the method, apparatus, and non-transitory computer-readable medium described above, the first scrambling sequence and the second scrambling sequence may be the same. In some examples of the method, apparatus, and non-transitory computer-readable medium described above, the first scrambling sequence and the second scrambling sequence may be different.

In some examples of the method, apparatus, and non-transitory computer-readable medium described above, receiving the transmission includes receiving the transmission spanning a single transmit antenna. In some examples of the method, apparatus, and non-transitory computer-readable medium described above, the first set of pilot tones and the second set of pilot tones may be associated with the single transmit antenna. In some examples of the method, apparatus, and non-transitory computer-readable medium described above, receiving the transmission includes receiving the transmission of the first set of pilot tones and the second set of pilot tones from a single transmit antenna.

In some examples of the method, apparatus, and non-transitory computer-readable medium described above, receiving the transmission includes receiving the transmission spanning a plurality of antennas. In some examples of the method, apparatus, and non-transitory computer-readable medium described above, the first set of pilot tones may be associated with a first transmit antenna of the plurality of antennas and the second set of pilot tones may be associated with a second transmit antenna of the plurality of antennas. In some examples of the method, apparatus, and non-transitory computer-readable medium described above, receiving the transmission includes receiving the transmission of the first set of pilot tones from a first transmit antenna and receiving the transmission of the second set of pilot tones from a second transmit antenna.

In some examples of the method, apparatus, and non-transitory computer-readable medium described above, receiving the transmission includes receiving the transmission during the first symbol and the second symbol, where the first symbol and the second symbol may be non-adjacent symbols. In some examples of the method, apparatus, and non-transitory computer-readable medium described above, receiving the transmission includes receiving the transmission during the first symbol and the second symbol, where the first symbol and the second symbol may be within a same resource block.

A method of wireless communication is described. The method may include scheduling a transmission including a first set of pilot tones and a second set of pilot tones, scrambling the first set of pilot tones and the second set of pilot tones based at least in part on a scrambling sequence, transmitting a first pilot tone of the scrambled first set of pilot tones at a first tone location during a first symbol, transmitting a second pilot tone of the scrambled first set of pilot tones at the first tone location during a second symbol, transmitting a first pilot tone of the scrambled second set of pilot tones at a second tone location during the first symbol, and transmitting a second pilot tone of the scrambled second set of pilot tones at the second tone location during the second symbol.

An apparatus for wireless communication is described. The apparatus may include means for scheduling a transmission including a first set of pilot tones and a second set of pilot tones, means for scrambling the first set of pilot tones and the second set of pilot tones based at least in part on a scrambling sequence, means for transmitting a first pilot tone of the scrambled first set of pilot tones at a first tone location during a first symbol, means for transmitting a second pilot tone of the scrambled first set of pilot tones at the first tone location during a second symbol, means for transmitting a first pilot tone of the scrambled second set of pilot tones at a second tone location during the first symbol, and means for transmitting a second pilot tone of the scrambled second set of pilot tones at the second tone location during the second symbol.

Another apparatus for wireless communication is described. The apparatus may include a processor, memory in electronic communication with the processor, and instructions stored in the memory. The instructions may be operable to cause the processor to schedule a transmission including a first set of pilot tones and a second set of pilot tones, scramble the first set of pilot tones and the second set of pilot tones based at least in part on a scrambling sequence, transmit a first pilot tone of the scrambled first set of pilot tones at a first tone location during a first symbol, transmit a second pilot tone of the scrambled first set of pilot tones at the first tone location during a second symbol, transmit a first pilot tone of the scrambled second set of pilot tones at a second tone location during the first symbol, and transmit a second pilot tone of the scrambled second set of pilot tones at the second tone location during the second symbol.

A non-transitory computer readable medium for wireless communication is described. The non-transitory computer-readable medium may include instructions operable to cause a processor to schedule a transmission including a first set of pilot tones and a second set of pilot tones, scramble the first set of pilot tones and the second set of pilot tones based at least in part on a scrambling sequence, transmit a first pilot tone of the scrambled first set of pilot tones at a first tone location during a first symbol, transmit a second pilot tone of the scrambled first set of pilot tones at the first tone location during a second symbol, transmit a first pilot tone of the scrambled second set of pilot tones at a second tone location during the first symbol, and transmit a second pilot tone of the scrambled second set of pilot tones at the second tone location during the second symbol.

In some examples of the method, apparatus, and non-transitory computer-readable medium described above, the first tone location and the second tone location may be contiguous. In some examples of the method, apparatus, and non-transitory computer-readable medium described above, the first tone location and the second tone location may be non-contiguous.

In some examples of the method, apparatus, and non-transitory computer-readable medium described above, scheduling the transmission includes scheduling the transmission to span a single antenna. In some examples of the method, apparatus, and non-transitory computer-readable medium described above, the first set of pilot tones and the second set of pilot tones may be associated with the single antenna. In some examples of the method, apparatus, and non-transitory computer-readable medium described above, scheduling the transmission includes scheduling the transmission to span a plurality of antennas. In some examples of the method, apparatus, and non-transitory computer-readable medium described above, the first set of pilot tones may be associated with a first antenna of the plurality of antennas and the second set of pilot tones may be associated with a second antenna of the plurality of antennas.

In some examples of the method, apparatus, and non-transitory computer-readable medium described above, scheduling the transmission includes scheduling the transmission during the first symbol and the second symbol, where the first symbol and the second symbol may be non-adjacent symbols. In some examples of the method, apparatus, and non-transitory computer-readable medium described above, scheduling the transmission includes scheduling the transmission during the first symbol and the second symbol, where the first symbol and the second symbol may be within a same resource block.

A method of wireless communication is described. The method may include receiving a transmission including a scrambled first set of pilot tones and a scrambled second set of pilot tones during a first symbol and a second symbol, the scrambled first set of pilot tones received at a first set of tone locations and the scrambled second set of pilot tones received at a second set of tone locations, identifying a scrambling sequence for the scrambled first set of pilot tones and the scrambled second set of pilot tones in the first symbol and the second symbol, and descrambling the scrambled first set of pilot tones and the scrambled second set of pilot tones based at least in part on the identified scrambling sequence.

An apparatus for wireless communication is described. The apparatus may include means for receiving a transmission including a scrambled first set of pilot tones and a scrambled second set of pilot tones during a first symbol and a second symbol, the scrambled first set of pilot tones received at a first set of tone locations and the scrambled second set of pilot tones received at a second set of tone locations, means for identifying a scrambling sequence for the scrambled first set of pilot tones and the scrambled second set of pilot tones in the first symbol and the second symbol, and means for descrambling the scrambled first set of pilot tones and the scrambled second set of pilot tones based at least in part on the identified scrambling sequence.

Another apparatus for wireless communication is described. The apparatus may include a processor, memory in electronic communication with the processor, and instructions stored in the memory. The instructions may be operable to cause the processor to receive a transmission including a scrambled first set of pilot tones and a scrambled second set of pilot tones during a first symbol and a second symbol, the scrambled first set of pilot tones received at a first set of tone locations and the scrambled second set of pilot tones received at a second set of tone locations, identify a scrambling sequence for the scrambled first set of pilot tones and the scrambled second set of pilot tones in the first symbol and the second symbol, and descramble the scrambled first set of pilot tones and the scrambled second set of pilot tones based at least in part on the identified scrambling sequence.

A non-transitory computer readable medium for wireless communication is described. The non-transitory computer-readable medium may include instructions operable to cause a processor to receive a transmission including a scrambled first set of pilot tones and a scrambled second set of pilot tones during a first symbol and a second symbol, the scrambled first set of pilot tones received at a first set of tone locations and the scrambled second set of pilot tones received at a second set of tone locations, identify a scrambling sequence for the scrambled first set of pilot tones and the scrambled second set of pilot tones in the first symbol and the second symbol, and descramble the scrambled first set of pilot tones and the scrambled second set of pilot tones based at least in part on the identified scrambling sequence.

Some examples of the method, apparatus, and non-transitory computer-readable medium described above may further include processes, features, means, or instructions for performing a channel estimation procedure based at least in part on the descrambled first set of pilot tones and the descrambled second set of pilot tones. Some examples of the method, apparatus, and non-transitory computer-readable medium described above may further include processes, features, means, or instructions for performing a channel estimation procedure based at least in part on the scrambled first set of pilot tones and the scrambled second set of pilot tones.

In some examples of the method, apparatus, and non-transitory computer-readable medium described above, a combination of the first set of tone locations and the second set of tone locations includes a contiguous set of tone locations. In some examples of the method, apparatus, and non-transitory computer-readable medium described above, a combination of the first set of tone locations and the second set of tone locations includes a non-contiguous set of tone locations.

In some examples of the method, apparatus, and non-transitory computer-readable medium described above, receiving the transmission includes receiving the transmission spanning a single transmit antenna. In some examples of the method, apparatus, and non-transitory computer-readable medium described above, the first set of pilot tones and the second set of pilot tones may be associated with the single transmit antenna. In some examples of the method, apparatus, and non-transitory computer-readable medium described above, receiving the transmission includes receiving the transmission of the scrambled first set of pilot tones and the scrambled second set of pilot tones from a single transmit antenna.

In some examples of the method, apparatus, and non-transitory computer-readable medium described above, receiving the transmission includes receiving the transmission spanning a plurality of antennas. In some examples of the method, apparatus, and non-transitory computer-readable medium described above, the first set of pilot tones may be associated with a first transmit antenna of the plurality of antennas and the second set of pilot tones may be associated with a second transmit antenna of the plurality of antennas. In some examples of the method, apparatus, and non-transitory computer-readable medium described above, receiving the transmission includes receiving the transmission of the scrambled first set of pilot tones from a first transmit antenna and receiving the transmission of the scrambled second set of pilot tones from a second transmit antenna.

In some examples of the method, apparatus, and non-transitory computer-readable medium described above, receiving the transmission includes receiving the transmission during the first symbol and the second symbol, where the first symbol and the second symbol may be non-adjacent symbols. In some examples of the method, apparatus, and non-transitory computer-readable medium described above, receiving the transmission includes receiving the transmission during the first symbol and the second symbol, where the first symbol and the second symbol may be within a same resource block.

BRIEF DESCRIPTION OF THE DRAWINGS

FIG. 2 illustrates an example of a wireless communications system that supports non-staggered reference signals and repeated pilots in OFDM in accordance with one or more aspects of the present disclosure;

DETAILED DESCRIPTION

Figure 1:
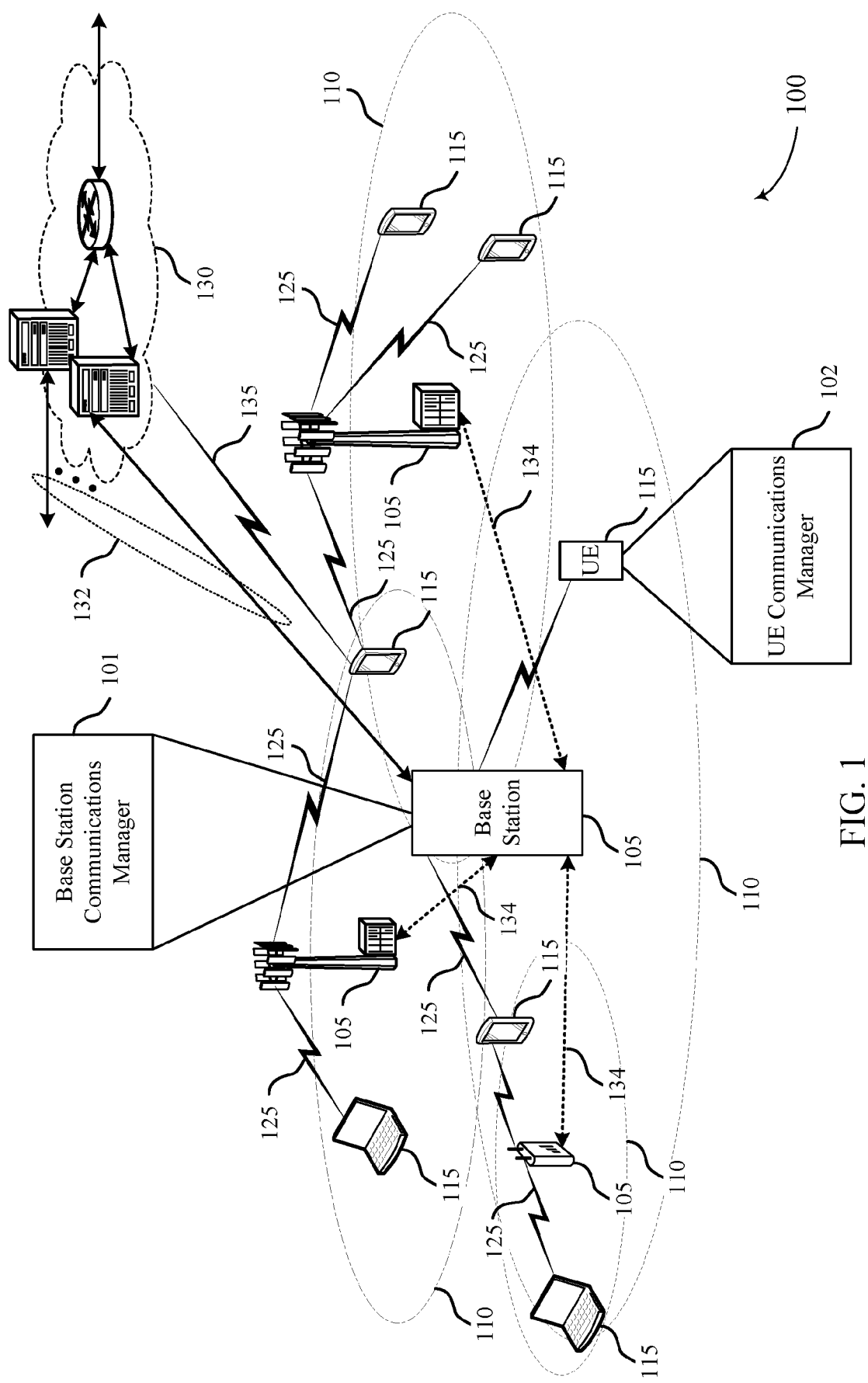
FIG. 1 illustrates an example of a wireless communications system that supports non-staggered reference signals and repeated pilots in OFDM in accordance with one or more aspects of the present disclosure.

Some wireless communications systems may support communication between a base station and a UE over an air interface. A base station may transmit data and control information in a downlink transmission to a UE over the air interface. In some cases, other signals transmitted by nearby wireless devices may interfere with the downlink transmission, and the downlink transmission may be distorted. For example, the amplitude and phase of the received downlink transmission at the UE may be different from the amplitude and phase of the original downlink transmission. As such, a UE may perform interference estimation and channel estimation to determine the correct phase and amplitude of the downlink transmission.

A base station may transmit pilot tones together with data and control information at periodic intervals to aid the UE in interference estimation and channel estimation. In some cases, the pilot tones may be staggered across symbols in order to cover a wide frequency range while keeping overhead at a minimum. As such, a base station may be able to use more resource elements for data and control information while providing pilot tones for a wide frequency range to a UE. However, the use of staggered pilot tones may result in increased complexity for interference estimation and channel estimation at a UE. In order to compute an interference estimate and a channel estimate, a UE may use a combination of information from pilot tones in the same tone location. With staggered pilot tones, the process of combining information from pilot tones in the same tone location may be time consuming since pilot tones on the same tone location are transmitted every other symbol, rather than every symbol. Therefore, it may be desirable for a wireless communications system to support techniques for reducing the complexity of channel estimation while maintaining broad frequency coverage for pilot tones.

In some examples, a base station may use non-staggered pilot tones to reduce the complexity of channel estimation at a UE. As such, a UE may combine information from pilot tones in the same tone location more efficiently. In some cases, a base station may transmit contiguous pilot tones in a symbol to maintain coverage of a wide range of frequencies. In other cases, a base station may transmit non-contiguous pilot tones to reduce overhead, and the base station may scramble the pilot tones on different symbols according to the same scrambling sequence. In such cases, a UE may perform interference estimation and channel estimation without information about the scrambling sequence.

Aspects of the disclosure are initially described in the context of a wireless communications system. In an example, a base station may schedule a transmission including pilot tones and data for a UE, and the base station may transmit the pilot tones together with the data according to a contiguous non-staggered symbol mapping. In another example, a base station may schedule a transmission including pilot tones and data for a UE. The base station may scramble the pilot tones on different symbols according to the same scrambling scheme, and the base station may then transmit the pilot tones together with the data according to a non-contiguous non-staggered symbol mapping. Aspects of the disclosure are further illustrated by and described with reference to apparatus diagrams, system diagrams, and flowcharts that relate to non-staggered reference signals and repeated pilots in OFDM.

FIG. 1 illustrates an example of a wireless communications system 100 that supports non-staggered reference signals and repeated pilots in OFDM in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be an LTE (or LTE-Advanced) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. UEs 115 may be dispersed throughout the wireless communications system 100, and each UE 115 may be stationary or mobile.

A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base station 105 may include base station communications manager 101, which may schedule a transmission including a first set of pilot tones and a second set of pilot tones, transmit a first pilot tone of the first set of pilot tones at a first tone location of a first symbol associated with a numerology, transmit a second pilot tone of the first set of pilot tones at the first tone location of a second symbol associated with the numerology, transmit a first pilot tone of the second set of pilot tones at a second tone location of the first symbol, and transmit a second pilot tone of the second set of pilot tones at the second tone location of the second symbol. In some cases, the first tone location and the second tone location may be contiguous.

Base station communications manager may also schedule a transmission including a first set of pilot tones and a second set of pilot tones, scramble the first set of pilot tones and the second set of pilot tones based at least in part on a scrambling sequence, transmit a first pilot tone of the scrambled first set of pilot tones at a first tone location during a first symbol, transmit a second pilot tone of the scrambled first set of pilot tones at the first tone location during a second symbol, transmit a first pilot tone of the scrambled second set of pilot tones at a second tone location during the first symbol, and transmit a second pilot tone of the scrambled second set of pilot tones at the second tone location during the second symbol. Base station communications manager 101 may be an example of base station communications manager 615 described with reference to FIG. 6.

UE 115 may include a UE communications manager 102, which may receive a transmission including a first set of pilot tones and a second set of pilot tones during a first symbol and a second symbol, the first set of pilot tones received at a first set of tone locations and the second set of pilot tones received at a second set of tone locations, where a combination of the first set of tone locations and the second set of tone locations includes a contiguous set of tone locations. The UE communications manager 102 may then perform a channel estimation procedure based on the first set of pilot tones and the second set of pilot tones.

UE communications manager 102 may also receive a transmission including a scrambled first set of pilot tones and a scrambled second set of pilot tones during a first symbol and a second symbol, the scrambled first set of pilot tones received at a first set of tone locations and the scrambled second set of pilot tones received at a second set of tone locations, identify a scrambling sequence for the scrambled first set of pilot tones and the scrambled second set of pilot tones in the first symbol and the second symbol, and descramble the scrambled first set of pilot tones and the scrambled second set of pilot tones based at least in part on the identified scrambling sequence. UE communications manager 102 may be an example of UE communications manager 1015 described with reference to FIG. 10.

Base stations 105 may communicate with the core network 130 through communication link 135 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may include a radio link control (RLC) layer that connects higher layers (e.g., radio resource control (RRC) and packet data convergence protocol (PDCP)) to the lower layers (e.g., the media access control (MAC) layer). An RLC entity in a base station 105 or a UE 115 may ensure that transmission packets are organized into appropriately sized blocks (corresponding to the MAC layer transport block size). If an incoming data packet (i.e., a PDCP or RRC service data unit (SDU)) is too big for transmission, the RLC layer may segment the data packet into several smaller RLC protocol data units (PDUs). If the incoming packets are too small, the RLC layer may concatenate several of them into a single, larger RLC protocol data unit (PDU). Each RLC PDU may include a header including information about how to reassemble the data. The RLC layer may also ensure that packets are reliably transmitted. The transmitter may keep a buffer of indexed RLC PDUs, and continue retransmission of each PDU until it receives the corresponding acknowledgement (ACK). In some cases, the transmitter may send a Poll Request to determine which PDUs have been received and the receiver may respond with a Status Report.

Multiple Input Multiple Output (MIMO) techniques use multiple antennas (e.g., antenna ports) at a base station 105 or multiple antennas at a UE 115 to take advantage of multipath environments and spatial resources to transmit multiple data streams. These spatial resources may be called spatial layers, and the same or different streams of data may be transmitted over different spatial layers. The use of multiple spatial layers may increase the reliability or capacity of transmissions through combining signals transmitted via different antenna ports or communicating different data streams via different antenna ports. In some cases, the use of spatial layers in wireless communications system 100 may be adaptive based on the channel quality of spatial layers. For example, a UE 115 may transmit a rank indicator (RI) indicating the number of spatial layers that support a signal-to-interference-plus-noise ratio (SINR) that is high enough for communication with the UE 115. A base station 105 may use the RI to determine the number of spatial layers to use for transmissions to the UE 115 (e.g., one (1) spatial layer for rank 1 transmissions and two (2) spatial layers for rank 2 transmissions).

A resource element may consist of one symbol period and one subcarrier (e.g., a 15 KHz frequency range). In some cases, the numerology employed within a system (i.e., symbol size, subcarrier size, symbol-period duration, and/or transmission time interval (TTI) duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

Synchronization (e.g., cell acquisition) may be performed using synchronization signals or channels transmitted by a synchronization source (e.g., a base station 105). Synchronization signals may include a primary synchronization signal (PSS), secondary source signal (SSS), physical broadcast channel (PBCH), etc. A UE 115 attempting to access a wireless network may perform an initial cell search by detecting a PSS from a base station 105. The PSS may enable synchronization of slot timing and may indicate a physical layer identity value. The PSS may be utilized to acquire timing and frequency portions of a cell identification (e.g., physical cell ID (PCID)). The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. An SSS may be used to acquire the full PCID and other system information (e.g., subframe index). The PBCH may be used to acquire additional system information needed for acquisition (e.g., bandwidth, frame index, etc.).

After identifying a cell via a PSS and receiving additional information via an SSS, a UE 115 may receive pilot tones (e.g., periodic pilot tones) from a base station 105 for use in channel estimation. A UE 115 may compute an amplitude and phase offset using the pilot tones, and the UE 115 may use this information to determine the correct amplitude and phase of a distorted signal. In some cases, the pilot tones may be cell specific reference signals (CRSs), and each cell-specific reference signal (CRS) may include one of 504 different cell identities. CRSs may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115.

In some cases, CRS may be staggered across a resource block where pilot tones transmitted during a first symbol may be at a different tone location from pilot tones transmitted during a second symbol. A base station 105 may use staggered reference signals in a resource block to cover a wide frequency range with relatively low overhead. Although staggered reference signals provide broad frequency coverage, the use of staggered reference signals increases the difficulty of averaging reference signals. That is, a UE 115 may have to wait longer to combine information from pilot tones on the same tone location, since reference signals on the same tone location are transmitted every other symbol, rather than every symbol. This may result in increased complexity at a UE for performing interference estimation and channel estimation.

In some cases, staggered reference signals may be scrambled using different scrambling sequences on different symbols. The use of different scrambling sequences may help a UE 115 to differentiate between reference signals transmitted by different cells. In addition, the use of different scrambling sequences for reference signals on different symbols may reduce interference and improve reliability of a transmission. However, the use of different scrambling sequences for pilot tones on different symbols may also increase the complexity of interference estimation and channel estimation, since a UE 115 may have to descramble the pilot tones before performing interference estimation and channel estimation.

Accordingly, wireless communications system 100 may support techniques for using non-staggered reference signals to increase the efficiency of the system and reduce the complexity of channel estimation. In an example, base station 105 may schedule a transmission to a UE 115 on two (2) antennas using spatial multiplexing. Base station 105 may use a first antenna to transmit a first set of pilot tones on a first set of tone locations of a first and second symbol (e.g., associated with the same numerology), and base station 105 may use a second antenna to transmit a second set of pilot tones on a second set of tone locations of the first and second symbol. In some cases, the combination of the first set of tone locations and the second set of tone locations may be a contiguous set of tone locations. Further, base station 105 may scramble the pilot tones on the first symbol and the second symbol using the same scrambling sequence, which may allow a UE 115 to perform part of a channel estimation procedure prior to descrambling the pilot tones, resulting in lower channel estimation complexity.

FIG. 2 illustrates an example of a system 200 for wireless communication that supports non-staggered reference signals and repeated pilots in OFDM in accordance with one or more aspects of the present disclosure. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a provides communication coverage for a respective coverage area 110-a, which may be an example of a coverage area 110 described with reference to FIG. 1. In some cases, base station 105-a may schedule a downlink transmission to UE 115-a over a carrier 205. For example, base station 105-a may schedule a downlink transmission to UE 115-a during a slot 210 of carrier 205. Base station 105-a may transmit pilot tones over symbols 215 and 220 of slot 210 to aid UE 115-a in channel estimation and coherent demodulation.

Wireless communications system 200 may support techniques for using non-staggered pilot tones to allow UE 115-a to efficiently perform interference estimation and channel estimation. Base station 105-a may scramble pilot tones mapped to symbol 215 and symbol 220 to reduce the interference from neighboring cells. In some cases, base station 105-a may scramble pilot tones on different symbols using different scrambling sequences. As such, UE 115-a may be able to differentiate pilot tones transmitted by different cells. In addition, pilot tones scrambled according to different scrambling sequences on different symbols may receive less interference than pilot tones scrambled according to the same scrambling sequence on different symbols. However, in some examples, the use of different scrambling sequences may increase the complexity of channel estimation.

As described herein, base station 105-a may support efficient techniques for scrambling pilot tones to reduce the complexity of channel estimation. Specifically, base station 105-a may scramble pilot tones on different symbols using the same scrambling sequence. In such cases, the complexity of channel estimation may be reduced since UE 115-a may not have to know the scrambling sequence to perform channel estimation. For example, in a cell acquisition procedure, UE 115-a may compute a frequency offset based on the pilot tones before knowing the scrambling information. Similarly, UE 115-a may compute an interference estimate from a combination of pilot tones before knowing the scrambling information.

Base station 105-a may then transmit the scrambled pilot tones in symbol 215 and symbol 220 of slot 210. Base station 105-a may map the pilot tones to resource elements in symbols 215 and 220 so that each pilot tone occupies the same tone location on each symbol (i.e., non-staggered). However, the use of non-staggered pilot tones may reduce the frequency coverage when compared to staggered pilot tones. In order to cover a wider frequency range, the pilot tones in symbol 215 and symbol 220 may be contiguous. In some examples, the pilot tones may span the entire band of a transmission, and, in other examples, the pilot tones may span a portion of the band of a transmission.

In some cases, base station 105-a may transmit the non-staggered pilot tones during symbol 215 and symbol 220 using one or more antennas. Each pilot tone mapped to a resource element of slot 210 may be associated with a single antenna. In an example, base station 105-a may use two (2) antennas to transmit to UE 115-a using spatial multiplexing. Base station 105-a may alternate the tone locations of pilot tones from each antenna so that the pilot tones are contiguous. For example, a first and third tone location may be used for pilot tones from a first antenna, and a second and fourth tone location may be used for pilot tones from a second antenna. As such, pilot tones from each antenna may cover a wide frequency range while reducing complexity of channel estimation at UE 115-a.

In another example, base station 105-a may use more than two (2) antennas (up to 4) for a transmission over slot 210. As such, pilot tones in a symbol may be interleaved for the different antennas or for a subset of the different antennas. That is, each symbol may include a pilot tone for each antenna or each symbol may include a pilot tone for a subset of the different antennas. Additionally, in some cases, more than two (2) symbols may include pilot tones for different antennas. As shown in the example of FIG. 2, the symbols used for transmission of the pilot tones may be non-adjacent. In another example, the symbols used for the transmission of the pilot tones may be adjacent (e.g., for more than two (2) antennas).

UE 115-a may receive the pilot tones and perform interference estimation and channel estimation. If the same scrambling sequence is used for pilot tones on symbol 215 and symbol 220, UE 115-a may perform part of a channel estimation procedure and all of an interference estimation procedure prior to detecting the scrambling sequence. If different scrambling sequences are used for pilot tones on symbol 215 and symbol 220, UE 115-a may identify the different scrambling sequences and descramble the pilot tones. Subsequently, the UE 115-a may perform channel estimation and interference estimation. In some cases, channel estimation and interference estimation may be based on the combination of pilot tones on the same tone location. Since the pilot tones are non-staggered, UE 115-*a* may be able to perform channel estimation and interference estimation using the combination of pilot tones on symbols 215 and 220.

Figure 3:
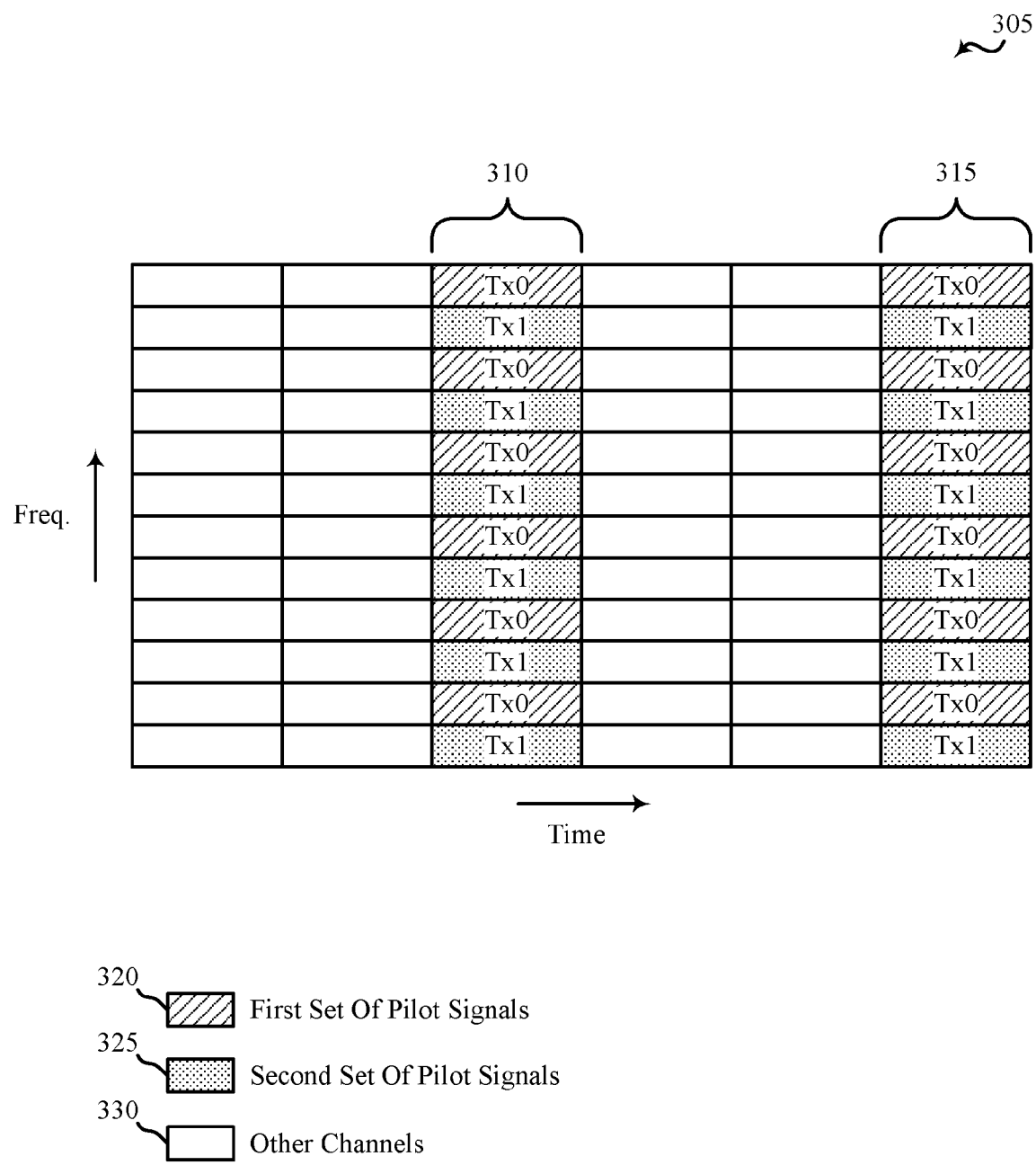
FIGS. 3 and 4 illustrate examples of resource element mapping for pilot tones in a system that supports non-staggered reference signals and repeated pilots in OFDM in accordance with one or more aspects of the present disclosure.

FIG. 3 illustrates an example of a resource element mapping 300 for pilot tones in a system that supports non-staggered reference signals and repeated pilots in OFDM in accordance with one or more aspects of the present disclosure. Base station 105 may schedule a downlink transmission to a UE 115 on two (2) antennas (e.g., Tx0 and Tx1) using spatial multiplexing, and base station 105 may allocate resources 305 for the downlink transmission to the UE 115. Allocated resources 305 may be a resource block or a portion of a resource block in a wireless communications system. The scheduled transmission may include data and control information transmitted on other channels 330 (e.g., a physical downlink shared channel (PDSCH)). The resource elements used for the transmission of data and control information may be rate matched around pilot tones mapped to non-adjacent symbols 310 and 315.

Base station 105 may use a first antenna to transmit a first set of pilot tones 320 and a second antenna to transmit a second set of pilot tones 325. The pilot tones may be non-staggered, where the tone locations of the first set of pilot tones and the tone locations of the second set of pilot tones are the same on both symbols 310 and 315. As shown, the pilot tones mapped to symbols 310 and 315 may be contiguous (e.g., where the first set of pilot tones 320 are interleaved with the second set of pilot tones 325). This arrangement of pilot tones over allocated resources 305 may allow a UE 115 to perform frequency tracking and channel estimation by averaging pilot tones on symbols 310 and 315. Additionally, the use of non-staggered pilot tones may allow for simpler interference estimation and channel estimation since pilot tones are transmitted on the same tone location in every symbol used for pilot tones, rather than every other symbol. The techniques described above with reference to FIG. 3 may, in some cases, be used as part of a fixed signaling scheme for pilot tones, where pilot tones are transmitted on non-staggered tone locations across multiple TTIs.

Figure 4:
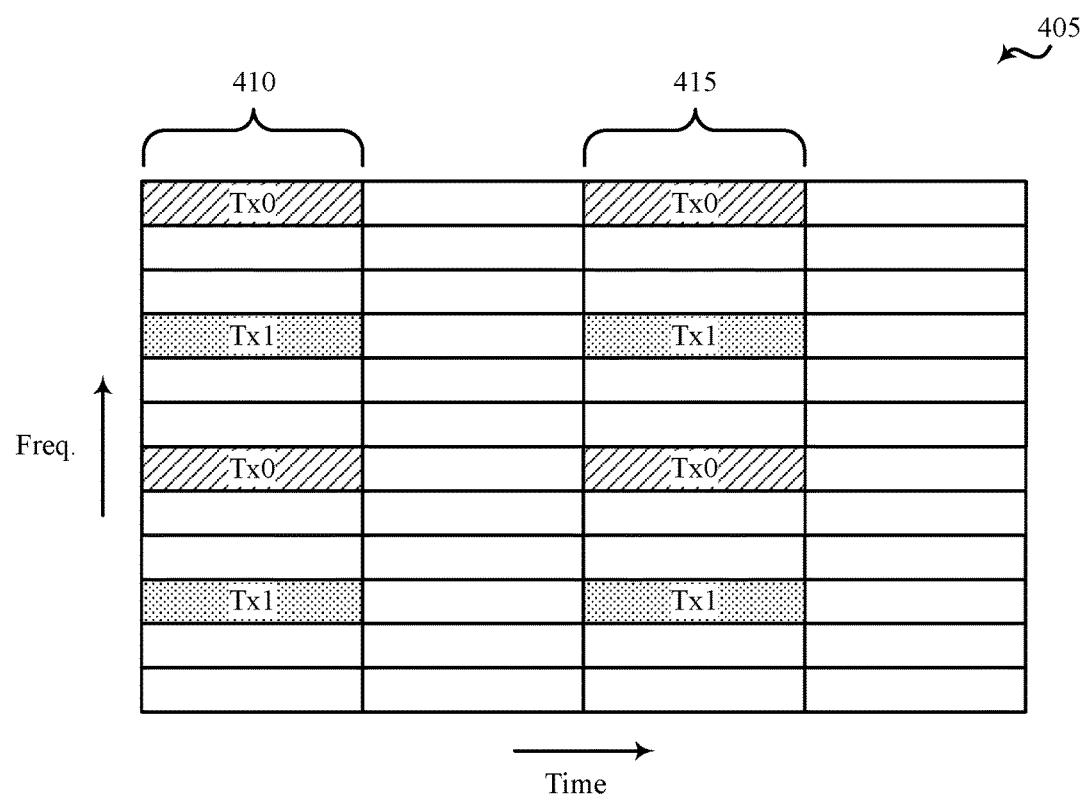

FIG. 4 illustrates an example of a resource element mapping 400 for pilot tones in a system that supports non-staggered reference signals and repeated pilots in OFDM in accordance with one or more aspects of the present disclosure. Base station 105 may schedule a downlink transmission to a UE 115 on two (2) antennas (e.g., Tx0 and Tx1) using spatial multiplexing, and the base station 105 may allocate resources 405 for the downlink transmission to the UE 115. Allocated resources 405 may be a portion of a resource block in a wireless communications system. The scheduled transmission may include data and control information transmitted on other channels 430 (e.g. PDSCH). The resource elements used for the transmission of data and control information may be rate matched around pilot tones mapped to non-adjacent symbols 410 and 415.

Base station 105 may use a first antenna to transmit a first set of pilot tones 420 and a second antenna to transmit a second set of pilot tones 425. The pilot tones may be non-staggered, where the tone locations of the first set of pilot tones and the tone locations of the second set of pilot tones are the same on both symbols 410 and 415. As shown, the pilot tones mapped to symbols 410 and 415 may be non-contiguous. A base station 105 may scramble the pilot tones on symbols 410 and 415 according to the same scrambling sequence. The use of non-staggered pilot tones may allow for simpler interference estimation and channel estimation since pilot tones are transmitted on the same tone location in every symbol used for pilot tones, rather than every other symbol. Additionally, the use of the same scrambling sequence for different symbols may allow a UE to perform interference estimation and at-least a part of a channel estimation procedure before detecting the scrambling sequence, thus reducing complexity.

Figure 5:
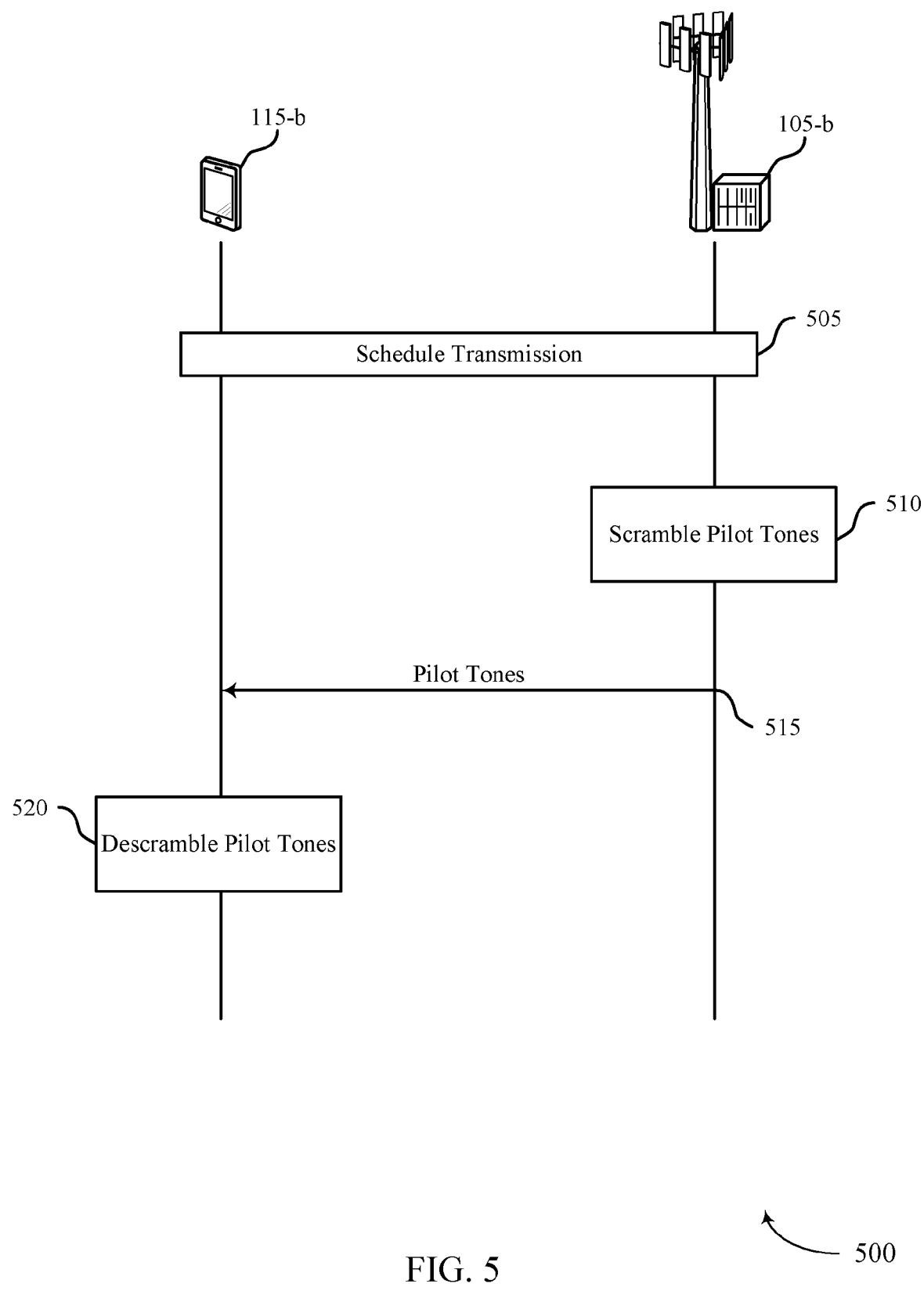
FIG. 5 illustrates an example of a process flow in a system that supports non-staggered reference signals and repeated pilots in OFDM in accordance with one or more aspects of the present disclosure.

FIG. 5 illustrates an example of a process flow 500 in a system that supports non-staggered reference signals and repeated pilots in OFDM in accordance with one or more aspects of the present disclosure. In some cases, process flow 500 may represent aspects of techniques performed by a UE 115 or a base station 105 as described with reference to FIGS. 1 and 2. In FIG. 5, a base station 105-*b* may communicate with a UE 115-*b*, and base station 105-*b* may transmit pilot tones to UE 115-*b* to aid in channel estimation and interference cancellation.

At 505, base station 105-*b* may communicate with UE 115-*b* to schedule a downlink transmission over a carrier. In some cases, scheduling the downlink transmission may include allocating resources (e.g., time and frequency resources) for the downlink transmission to UE 115-*b*. The downlink transmission may include data and control information rate matched around pilot tones mapped to the allocated resources. In some examples, the transmission may span a single antenna, and the pilot tones may be associated with the single antenna. In other examples, the transmission may span a plurality of antennas, and the pilot tones may include a first set of pilot tones associated with a first antenna of the plurality of antennas and a second set of pilot tones associated with a second antenna of the plurality of antennas. In an example, base station 105-*b* may transmit the first set of pilot tones and the second set of pilot tones during a first symbol and a second symbol of a same resource block (e.g., adjacent or non-adjacent symbols).

At 510, base station 105-*b* may scramble the first set of pilot tones and the second set of pilot tones based on a scrambling sequence. In some cases, base station 105-*b* may identify a first scrambling sequence associated with the transmission during the first symbol and a second scrambling sequence associated with the transmission during the second symbol, where the first scrambling sequence is different from the second scrambling sequence. In such cases, base station 105-*b* may scramble the pilot tones for the transmission during the first symbol based on the first scrambling sequence, and base station 105-*b* may scramble the pilot tones for the transmission during the second symbol based on the second scrambling sequence. In other cases, the first scrambling sequence and the second scrambling sequence may be the same, and base station 105-*b* may scramble the pilot tones on both symbols based on the same scrambling sequence.

At 515, base station 105-*b* may transmit the pilot tones to UE 115-*b*. In some cases, base station 105-*b* may include data and control information with the transmission of the pilot tones, and UE 115-*b* may perform interference estimation and channel estimation using the pilot tones to correctly decode the data and control information. In an example, base station 105-*b* may transmit a first pilot tone of the first set of pilot tones at a first tone location of the first symbol associated with a numerology, and base station 105-*b* may transmit a second pilot tone of the first set of pilot tones at the first tone location of the second symbol associated with the numerology. Additionally, base station 105-*b* may transmit a first pilot tone of the second set of pilot tones at a second tone location of the first symbol, and base station 105-*b* may transmit a second pilot tone of the second set of pilot tones at the second tone location of the second symbol. In some cases, the first tone location and the second tone location may be contiguous, and, in other cases, the first tone location and the second tone location may be non-contiguous.

At 520, UE 115-*b* may descramble the first set of pilot tones and the second set of pilot tones based on a scrambling sequence. In some cases, UE 115-*b* may identify a first scrambling sequence associated with the transmission during the first symbol and a second scrambling sequence associated with the transmission during the second symbol, where the first scrambling sequence is different from the second scrambling sequence. In such cases, UE 115-*b* may descramble the pilot tones mapped to the first symbol based on the first scrambling sequence, and UE 115-*b* may descramble the pilot tones mapped to the second symbol based on the second scrambling sequence. In other cases, the first scrambling sequence and the second scrambling sequence may be the same, and UE 115-*b* may descramble the pilot tones on both symbols based on the same scrambling sequence. In some examples, UE 115-*b* may perform interference estimation and channel estimation based on the descrambled pilot tones. Alternatively, if the same scrambling sequence is used for both symbols, UE 115-*b* may perform interference estimation and a part of a channel estimation procedure based on the scrambled pilot tones received at 515 (i.e., prior to descrambling the pilot tones).

Figure 6:
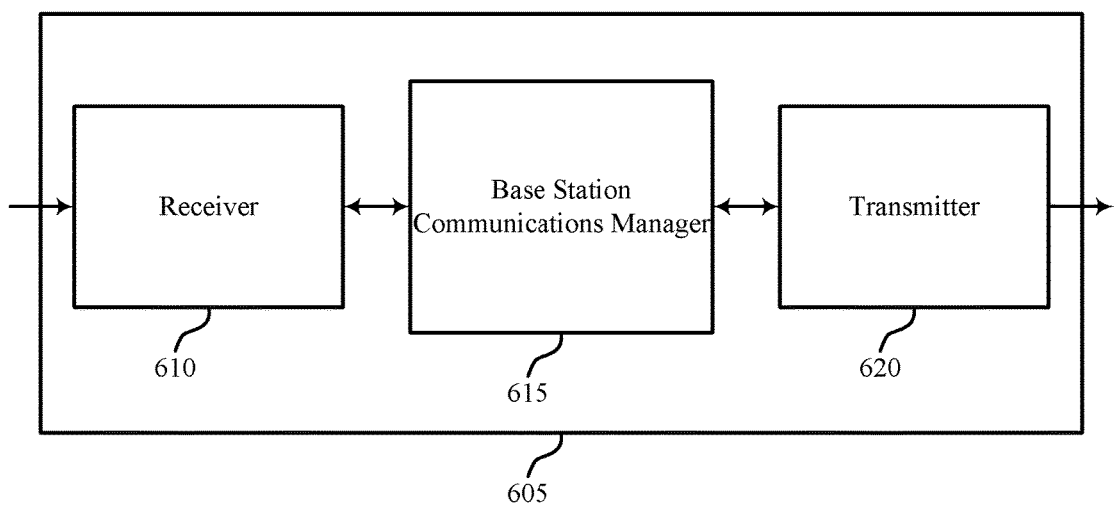
FIGS. 6 through 8 show block diagrams of a device that supports non-staggered reference signals and repeated pilots in OFDM in accordance with one or more aspects of the present disclosure.

FIG. 6 shows a block diagram 600 of a wireless device 605 that supports non-staggered reference signals and repeated pilots in OFDM in accordance with one or more aspects of the present disclosure. Wireless device 605 may be an example of aspects of a base station 105 as described with reference to FIG. 1. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to non-staggered reference signals and repeated pilots in OFDM, etc.). Information may be passed on to other components of the device. The receiver 610 may be an example of aspects of the transceiver 935 described with reference to FIG. 9.

Base station communications manager 615 may be an example of aspects of the base station communications manager 915 described with reference to FIG. 9. Base station communications manager 615 may schedule a transmission including a first set of pilot tones and a second set of pilot tones, transmit a first pilot tone of the first set of pilot tones at a first tone location of a first symbol associated with a numerology, transmit a second pilot tone of the first set of pilot tones at the first tone location of a second symbol associated with the numerology, transmit a first pilot tone of the second set of pilot tones at a second tone location of the first symbol, and transmit a second pilot tone of the second set of pilot tones at the second tone location of the second symbol, the first tone location and the second tone location being contiguous.

The base station communications manager 615 may also schedule a transmission including a first set of pilot tones and a second set of pilot tones, scramble the first set of pilot tones and the second set of pilot tones based on a scrambling sequence, transmit a first pilot tone of the scrambled first set of pilot tones at a first tone location during a first symbol, transmit a second pilot tone of the scrambled first set of pilot tones at the first tone location during a second symbol, transmit a first pilot tone of the scrambled second set of pilot tones at a second tone location during the first symbol, and transmit a second pilot tone of the scrambled second set of pilot tones at the second tone location during the second symbol.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
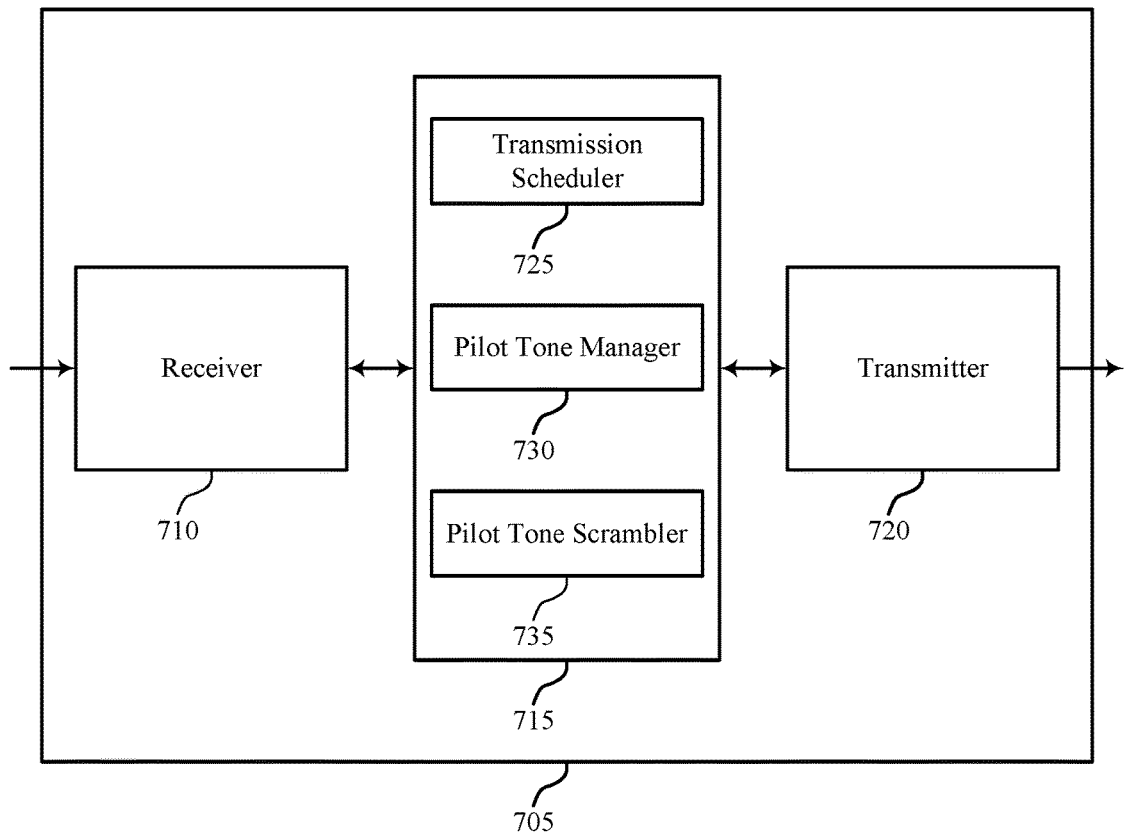

FIG. 7 shows a block diagram 700 of a wireless device 705 that supports non-staggered reference signals and repeated pilots in OFDM in accordance with one or more aspects of the present disclosure. Wireless device 705 may be an example of aspects of a wireless device 605 or a base station 105 as described with reference to FIGS. 1 and 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to non-staggered reference signals and repeated pilots in OFDM, etc.). Information may be passed on to other components of the device. The receiver 710 may be an example of aspects of the transceiver 935 described with reference to FIG. 9.

Base station communications manager 715 may be an example of aspects of the base station communications manager 915 described with reference to FIG. 9. Base station communications manager 715 may also include transmission scheduler 725, pilot tone manager 730, and pilot tone scrambler 735.

Transmission scheduler 725 may schedule a transmission including a first set of pilot tones and a second set of pilot tones. In some cases, scheduling the transmission includes scheduling the transmission to span a single antenna. In some cases, scheduling the transmission includes scheduling the transmission to span a set of antennas. In some cases, scheduling the transmission includes scheduling the transmission during a first symbol and a second symbol, where the first symbol and the second symbol are non-adjacent symbols. In some cases, scheduling the transmission includes scheduling the transmission during the first symbol and the second symbol, where the first symbol and the second symbol are within a same resource block.

Pilot tone manager 730 may transmit a first pilot tone of the first set of pilot tones at a first tone location of a first symbol associated with a numerology, transmit a second pilot tone of the first set of pilot tones at the first tone location of a second symbol associated with the numerology, transmit a first pilot tone of the second set of pilot tones at a second tone location of the first symbol, and transmit a second pilot tone of the second set of pilot tones at the second tone location of the second symbol, the first tone location and the second tone location being contiguous. Pilot tone manager 730 may also transmit a first pilot tone of the scrambled first set of pilot tones at a first tone location during a first symbol, transmit a second pilot tone of the scrambled first set of pilot tones at the first tone location during a second symbol, transmit a first pilot tone of the scrambled second set of pilot tones at a second tone location during the first symbol, and transmit a second pilot tone of the scrambled second set of pilot tones at the second tone location during the second symbol. In some cases, the first set of pilot tones and the second set of pilot tones are associated with a single antenna. In some cases, the first set of pilot tones is associated with a first antenna of a set of antennas and the second set of pilot tones is associated with a second antenna of the set of antennas. In some cases, the first tone location and the second tone location are contiguous. In some cases, the first tone location and the second tone location are non-contiguous.

Pilot tone scrambler 735 may scramble the first set of pilot tones and the second set of pilot tones based on a scrambling sequence (e.g., a same scrambling sequence). Pilot tone scrambler 735 may also scramble the first set of pilot tones and the second set of pilot tones in the first symbol based on a first scrambling sequence, and scramble the first set of pilot tones and the second set of pilot tones in the second symbol based on a second scrambling sequence.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
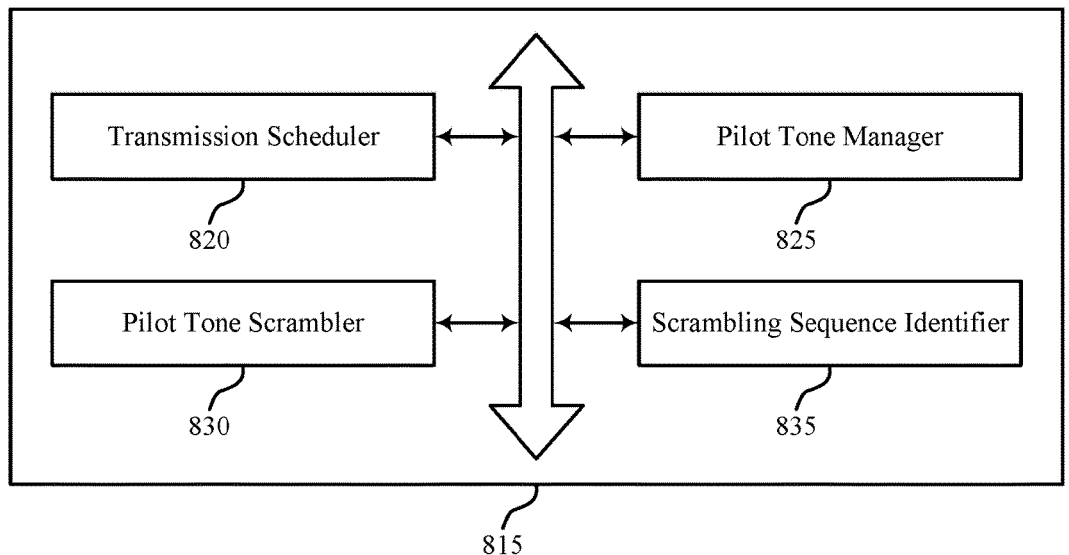

FIG. 8 shows a block diagram 800 of a base station communications manager 815 that supports non-staggered reference signals and repeated pilots in OFDM in accordance with one or more aspects of the present disclosure. The base station communications manager 815 may be an example of aspects of a base station communications manager 615, a base station communications manager 715, or a base station communications manager 915 described with reference to FIGS. 6, 7, and 9. The base station communications manager 815 may include transmission scheduler 820, pilot tone manager 825, pilot tone scrambler 830, and scrambling sequence identifier 835. Each of these modules may communicate, directly or indirectly, with one another (e.g., via one or more buses).

Transmission scheduler 820 may schedule a transmission including a first set of pilot tones and a second set of pilot tones. In some cases, scheduling the transmission includes scheduling the transmission to span a single antenna. In some cases, scheduling the transmission includes scheduling the transmission to span a set of antennas. In some cases, scheduling the transmission includes scheduling the transmission during the first symbol and the second symbol, where the first symbol and the second symbol are non-adjacent symbols. In some cases, scheduling the transmission includes scheduling the transmission during the first symbol and the second symbol, where the first symbol and the second symbol are within a same resource block.

Pilot tone manager 825 may transmit a first pilot tone of the first set of pilot tones at a first tone location of a first symbol associated with a numerology, transmit a second pilot tone of the first set of pilot tones at the first tone location of a second symbol associated with the numerology, transmit a first pilot tone of the second set of pilot tones at a second tone location of the first symbol, and transmit a second pilot tone of the second set of pilot tones at the second tone location of the second symbol, the first tone location and the second tone location being contiguous. In some cases, the first set of pilot tones and the second set of pilot tones are associated with a single antenna. In some cases, the first set of pilot tones is associated with a first antenna of a set of antennas and the second set of pilot tones is associated with a second antenna of the set of antennas.

Pilot tone manager 825 may also transmit a first pilot tone of a scrambled first set of pilot tones at a first tone location during a first symbol, transmit a second pilot tone of the scrambled first set of pilot tones at the first tone location during a second symbol, transmit a first pilot tone of the scrambled second set of pilot tones at a second tone location during the first symbol, and transmit a second pilot tone of the scrambled second set of pilot tones at the second tone location during the second symbol. In some cases, the first tone location and the second tone location are contiguous. In some cases, the first tone location and the second tone location are non-contiguous.

Pilot tone scrambler 830 may scramble the first set of pilot tones and the second set of pilot tones in the first symbol based on a first scrambling sequence, and scramble the first set of pilot tones and the second set of pilot tones in the second symbol based on a second scrambling sequence. Pilot tone scrambler 830 may also scramble the first set of pilot tones and the second set of pilot tones based on a scrambling sequence.

Scrambling sequence identifier 835 may identify a first scrambling sequence associated with the transmission during the first symbol and a second scrambling sequence associated with the transmission during the second symbol. In some cases, the first scrambling sequence and the second scrambling sequence are the same. In some cases, the first scrambling sequence and the second scrambling sequence are different.

Figure 9:
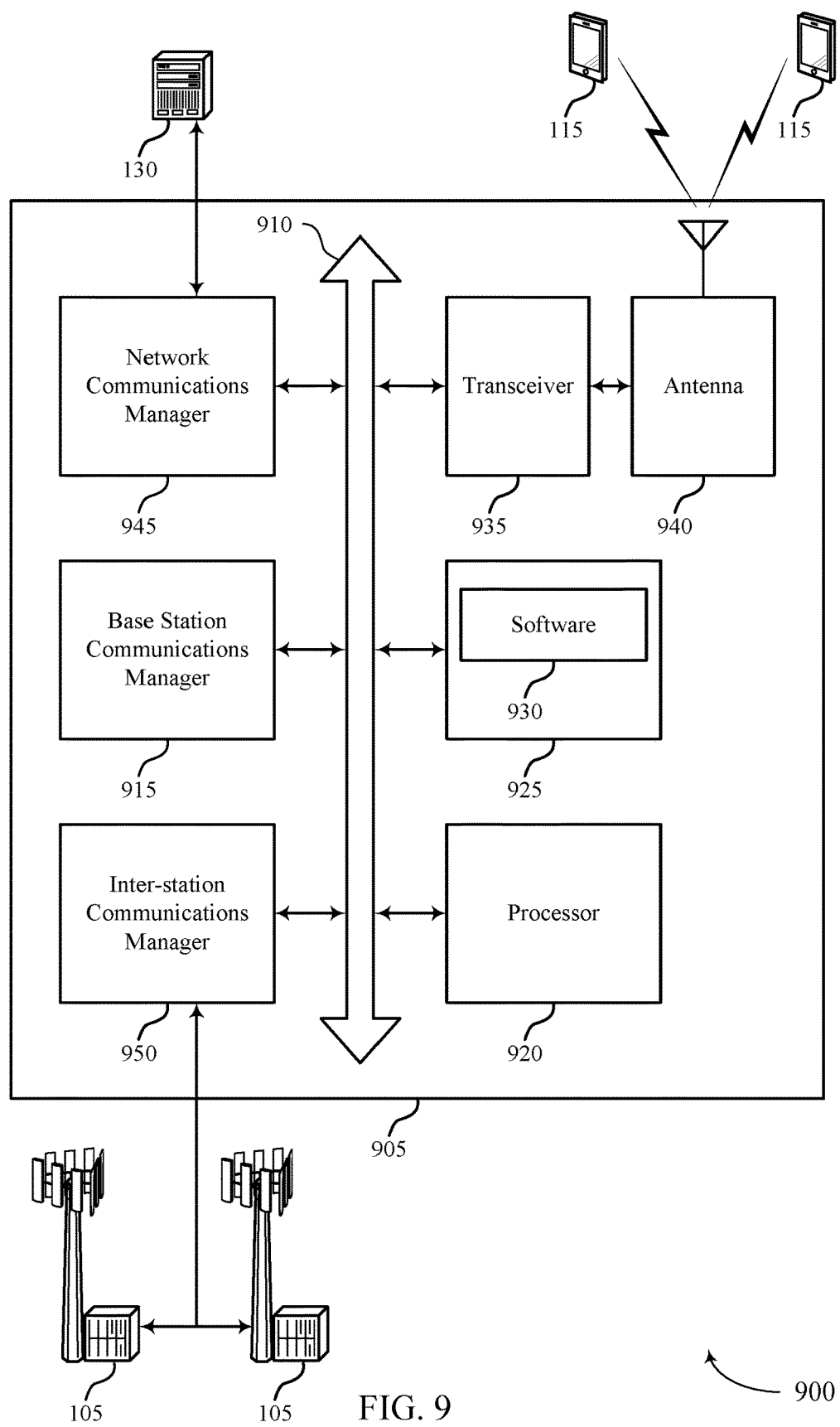
FIG. 9 illustrates a block diagram of a system including a base station that supports non-staggered reference signals and repeated pilots in OFDM in accordance with one or more aspects of the present disclosure.

FIG. 9 shows a diagram of a system 900 including a device 905 that supports non-staggered reference signals and repeated pilots in OFDM in accordance with one or more aspects of the present disclosure. Device 905 may be an example of or include the components of wireless device 605, wireless device 705, or a base station 105 as described above, e.g., with reference to FIGS. 1, 6 and 7. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more busses (e.g., bus 910). Device 905 may communicate wirelessly with one or more UEs 115.

Base station communications manager 915 may manage communications with other base station 105, and may include a controller or scheduler for controlling communications with UEs 115 in cooperation with other base stations 105. For example, the base station communications manager 915 may coordinate scheduling for transmissions to UEs 115 for various interference mitigation techniques such as beamforming or joint transmission. In some examples, base station communications manager 915 may provide an X2 interface within an LTE/LTE-A wireless communication network technology to provide communication between base stations 105.

Processor 920 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting non-staggered reference signals and repeated pilots in OFDM).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support non-staggered reference signals and repeated pilots in OFDM. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base stations 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an LTE/LTE-A wireless communication network technology to provide communication between base stations 105.

Figure 10:
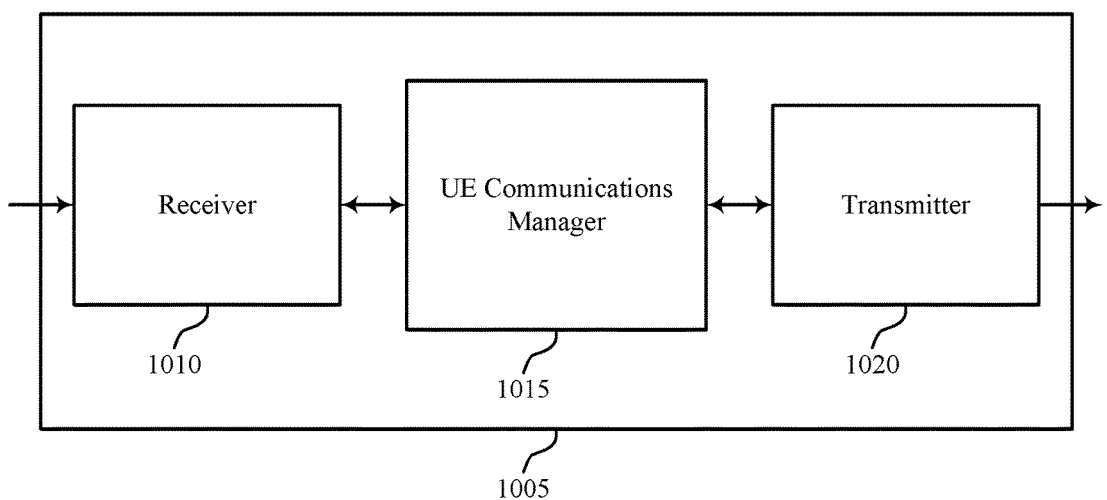
FIGS. 10 through 12 show block diagrams of a device that supports non-staggered reference signals and repeated pilots in OFDM in accordance with one or more aspects of the present disclosure.

FIG. 10 shows a block diagram 1000 of a wireless device 1005 that supports non-staggered reference signals and repeated pilots in OFDM in accordance with one or more aspects of the present disclosure. Wireless device 1005 may be an example of aspects of a UE 115 as described with reference to FIG. 1. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to non-staggered reference signals and repeated pilots in OFDM, etc.). Information may be passed on to other components of the device. The receiver 1010 may be an example of aspects of the transceiver 1335 described with reference to FIG. 13.

In some cases, receiver 1010 may receive a transmission that spans a single antenna. In other cases, receiver 1010 may receive a transmission that spans a set of antennas. In some cases, receiving the transmission may include receiving the transmission during a first symbol and a second symbol, where the first symbol and the second symbol are non-adjacent symbols and/or where the first symbol and the second symbol are within a same resource block.

UE communications manager 1015 may be an example of aspects of the UE communications manager 1315 described with reference to FIG. 13. UE communications manager 1015 may receive a transmission including a first set of pilot tones and a second set of pilot tones during a first symbol associated with a numerology and a second symbol associated with the numerology, the first set of pilot tones received at a first set of tone locations and the second set of pilot tones received at a second set of tone locations, where a combination of the first set of tone locations and the second set of tone locations includes a contiguous set of tone locations and perform a channel estimation procedure based on the first set of pilot tones and the second set of pilot tones.

The UE communications manager 1015 may also receive a transmission including a scrambled first set of pilot tones and a scrambled second set of pilot tones during a first symbol and a second symbol, the scrambled first set of pilot tones received at a first set of tone locations and the scrambled second set of pilot tones received at a second set of tone locations, identify a scrambling sequence for the scrambled first set of pilot tones and the scrambled second set of pilot tones in the first symbol and the second symbol, and descramble the scrambled first set of pilot tones and the scrambled second set of pilot tones based on the identified scrambling sequence.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
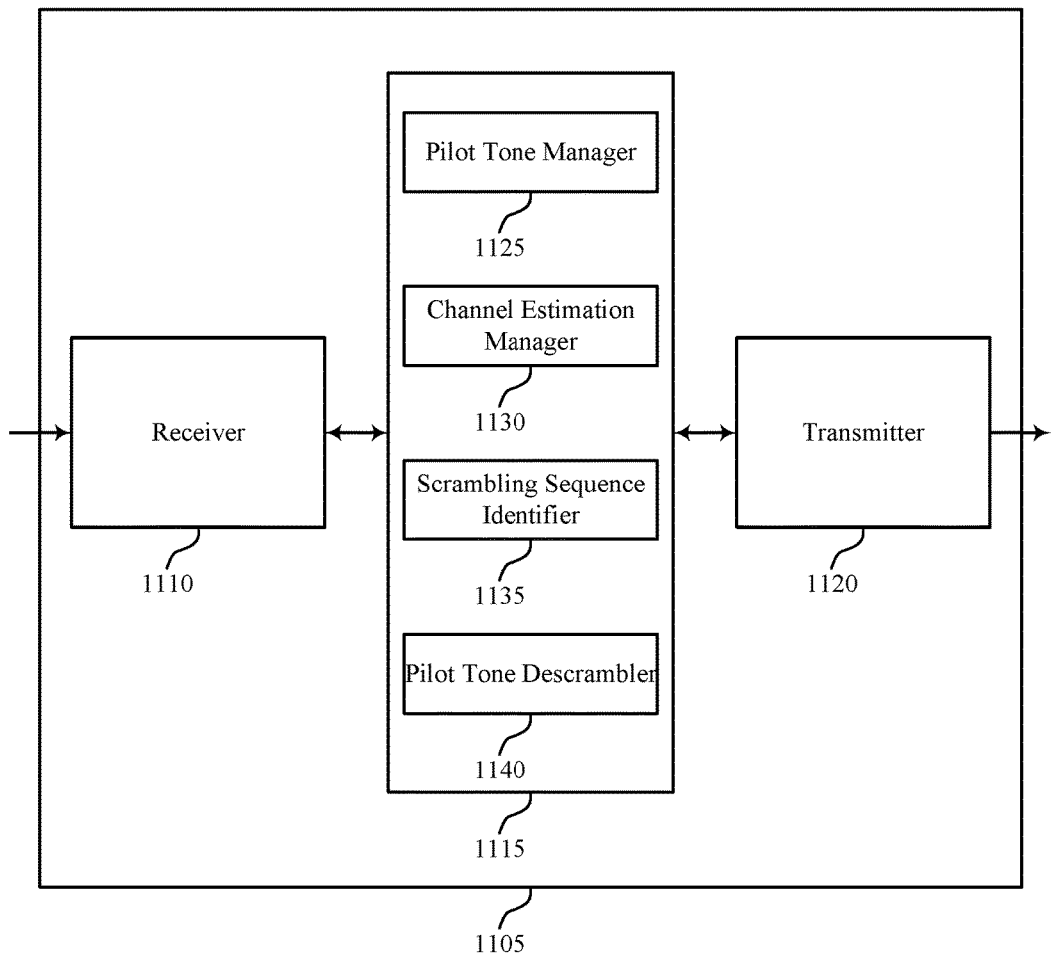

FIG. 11 shows a block diagram 1100 of a wireless device 1105 that supports non-staggered reference signals and repeated pilots in OFDM in accordance with one or more aspects of the present disclosure. Wireless device 1105 may be an example of aspects of a wireless device 1005 or a UE 115 as described with reference to FIGS. 1 and 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to non-staggered reference signals and repeated pilots in OFDM, etc.). Information may be passed on to other components of the device. The receiver 1110 may be an example of aspects of the transceiver 1335 described with reference to FIG. 13.

UE communications manager 1115 may be an example of aspects of the UE communications manager 1315 described with reference to FIG. 13. UE communications manager 1115 may include pilot tone manager 1125, channel estimation manager 1130, scrambling sequence identifier 1135, and pilot tone descrambler 1140.

Pilot tone manager 1125 may receive a transmission including a first set of pilot tones and a second set of pilot tones during a first symbol associated with a numerology and a second symbol associated with the numerology, the first set of pilot tones received at a first set of tone locations and the second set of pilot tones received at a second set of tone locations, where a combination of the first set of tone locations and the second set of tone locations includes a contiguous set of tone locations. In some cases, the first set of pilot tones and the second set of pilot tones are associated with a single transmit antenna. In some cases, receiving the transmission includes receiving the transmission of the first set of pilot tones and the second set of pilot tones from a single transmit antenna. In some cases, the first set of pilot tones is associated with a first transmit antenna of a set of antennas and the second set of pilot tones is associated with a second transmit antenna of the set of antennas. In some cases, receiving the transmission includes receiving the transmission of the first set of pilot tones from a first transmit antenna and receiving the transmission of the second set of pilot tones from a second transmit antenna.

Pilot tone manager 1125 may also receive a transmission including a scrambled first set of pilot tones and a scrambled second set of pilot tones during a first symbol and a second symbol, the scrambled first set of pilot tones received at a first set of tone locations and the scrambled second set of pilot tones received at a second set of tone locations. In some cases, a combination of the first set of tone locations and the second set of tone locations includes a contiguous set of tone locations. In some cases, a combination of the first set of tone locations and the second set of tone locations includes a non-contiguous set of tone locations. In some cases, receiving the transmission includes receiving the transmission of the scrambled first set of pilot tones and the scrambled second set of pilot tones from a single transmit antenna. In some cases, receiving the transmission includes receiving the transmission of the scrambled first set of pilot tones from a first transmit antenna and receiving the transmission of the scrambled second set of pilot tones from a second transmit antenna.

Channel estimation manager 1130 may perform a channel estimation procedure based on the first set of pilot tones and the second set of pilot tones, perform a channel estimation procedure based on the descrambled first set of pilot tones and the descrambled second set of pilot tones, or perform a channel estimation procedure based on the scrambled first set of pilot tones and the scrambled second set of pilot tones.

In some cases, scrambling sequence identifier 1135 may identify a scrambling sequence for the scrambled first set of pilot tones and the scrambled second set of pilot tones in the first symbol and the second symbol. In other cases, scrambling sequence identifier 1135 may identify a first scrambling sequence associated with the transmission during the first symbol and a second scrambling sequence associated with the transmission during the second symbol. In some cases, the first scrambling sequence and the second scrambling sequence are the same. In some cases, the first scrambling sequence and the second scrambling sequence are different.

Pilot tone descrambler 1140 may descramble the first set of pilot tones and the second set of pilot tones in the first symbol based on the first scrambling sequence, and descramble the first set of pilot tones and the second set of pilot tones in the second symbol based on the second scrambling sequence. Pilot tone descrambler 1140 may also descramble the scrambled first set of pilot tones and the scrambled second set of pilot tones based on the identified scrambling sequence.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
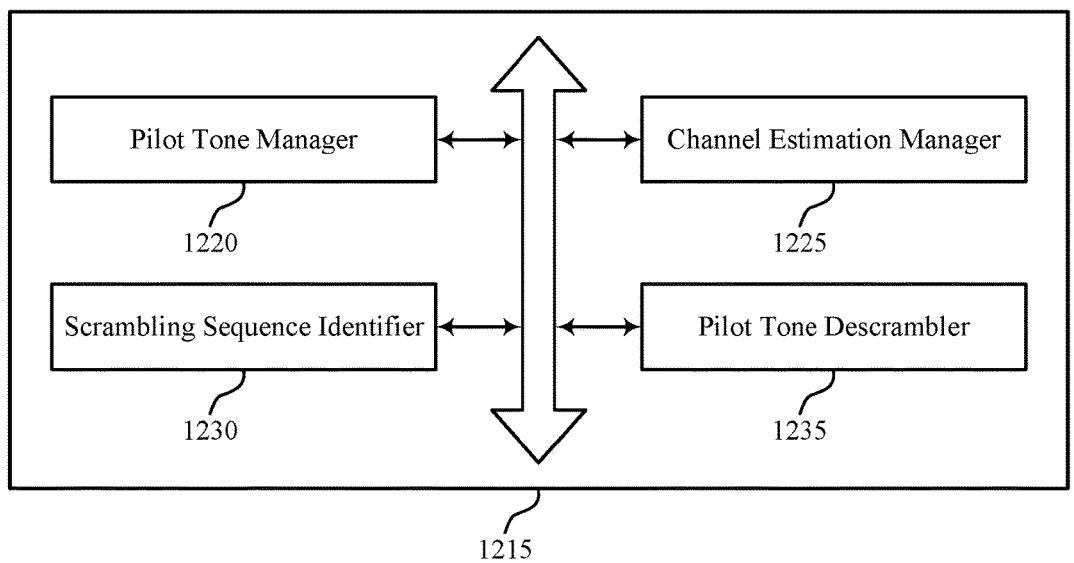

FIG. 12 shows a block diagram 1200 of a UE communications manager 1215 that supports non-staggered reference signals and repeated pilots in OFDM in accordance with one or more aspects of the present disclosure. The UE communications manager 1215 may be an example of aspects of a UE communications manager 1315 described with reference to FIGS. 10, 11, and 13. The UE communications manager 1215 may include pilot tone manager 1220, channel estimation manager 1225, scrambling sequence identifier 1230, and pilot tone descrambler 1235. Each of these modules may communicate, directly or indirectly, with one another (e.g., via one or more buses).

Pilot tone manager 1220 may receive a transmission including a first set of pilot tones and a second set of pilot tones during a first symbol associated with a numerology and a second symbol associated with the numerology, the first set of pilot tones received at a first set of tone locations and the second set of pilot tones received at a second set of tone locations, where a combination of the first set of tone locations and the second set of tone locations includes a contiguous set of tone locations. In some cases, the first set of pilot tones and the second set of pilot tones are associated with the single transmit antenna. In some cases, receiving the transmission includes receiving the transmission of the first set of pilot tones and the second set of pilot tones from a single transmit antenna. In some cases, the first set of pilot tones is associated with a first transmit antenna of the set of antennas and the second set of pilot tones is associated with a second transmit antenna of the set of antennas. In some cases, receiving the transmission includes receiving the transmission of the first set of pilot tones from a first transmit antenna and receiving the transmission of the second set of pilot tones from a second transmit antenna.

Pilot tone manager 1220 may also receive a transmission including a scrambled first set of pilot tones and a scrambled second set of pilot tones during a first symbol and a second symbol, the scrambled first set of pilot tones received at a first set of tone locations and the scrambled second set of pilot tones received at a second set of tone locations. In some cases, a combination of the first set of tone locations and the second set of tone locations includes a contiguous set of tone locations. In some cases, a combination of the first set of tone locations and the second set of tone locations includes a non-contiguous set of tone locations. In some cases, receiving the transmission includes receiving the transmission of the scrambled first set of pilot tones and the scrambled second set of pilot tones from a single transmit antenna. In some cases, receiving the transmission includes receiving the transmission of the scrambled first set of pilot tones from a first transmit antenna and receiving the transmission of the scrambled second set of pilot tones from a second transmit antenna.

Channel estimation manager 1225 may perform a channel estimation procedure based on the first set of pilot tones and the second set of pilot tones, perform a channel estimation procedure based on the descrambled first set of pilot tones and the descrambled second set of pilot tones, or perform a channel estimation procedure based on the scrambled first set of pilot tones and the scrambled second set of pilot tones.

In some cases, scrambling sequence identifier 1230 may identify a scrambling sequence for the scrambled first set of pilot tones and the scrambled second set of pilot tones in the first symbol and the second symbol. In other cases, scrambling sequence identifier 1230 may identify a first scrambling sequence associated with the transmission during the first symbol and a second scrambling sequence associated with the transmission during the second symbol. In some cases, the first scrambling sequence and the second scrambling sequence are the same. In some cases, the first scrambling sequence and the second scrambling sequence are different.

Pilot tone descrambler 1235 may descramble the first set of pilot tones and the second set of pilot tones in the first symbol based on the first scrambling sequence, and descramble the first set of pilot tones and the second set of pilot tones in the second symbol based on the second scrambling sequence. Pilot tone descrambler 1235 may also descramble the scrambled first set of pilot tones and the scrambled second set of pilot tones based on the identified scrambling sequence.

Figure 13:
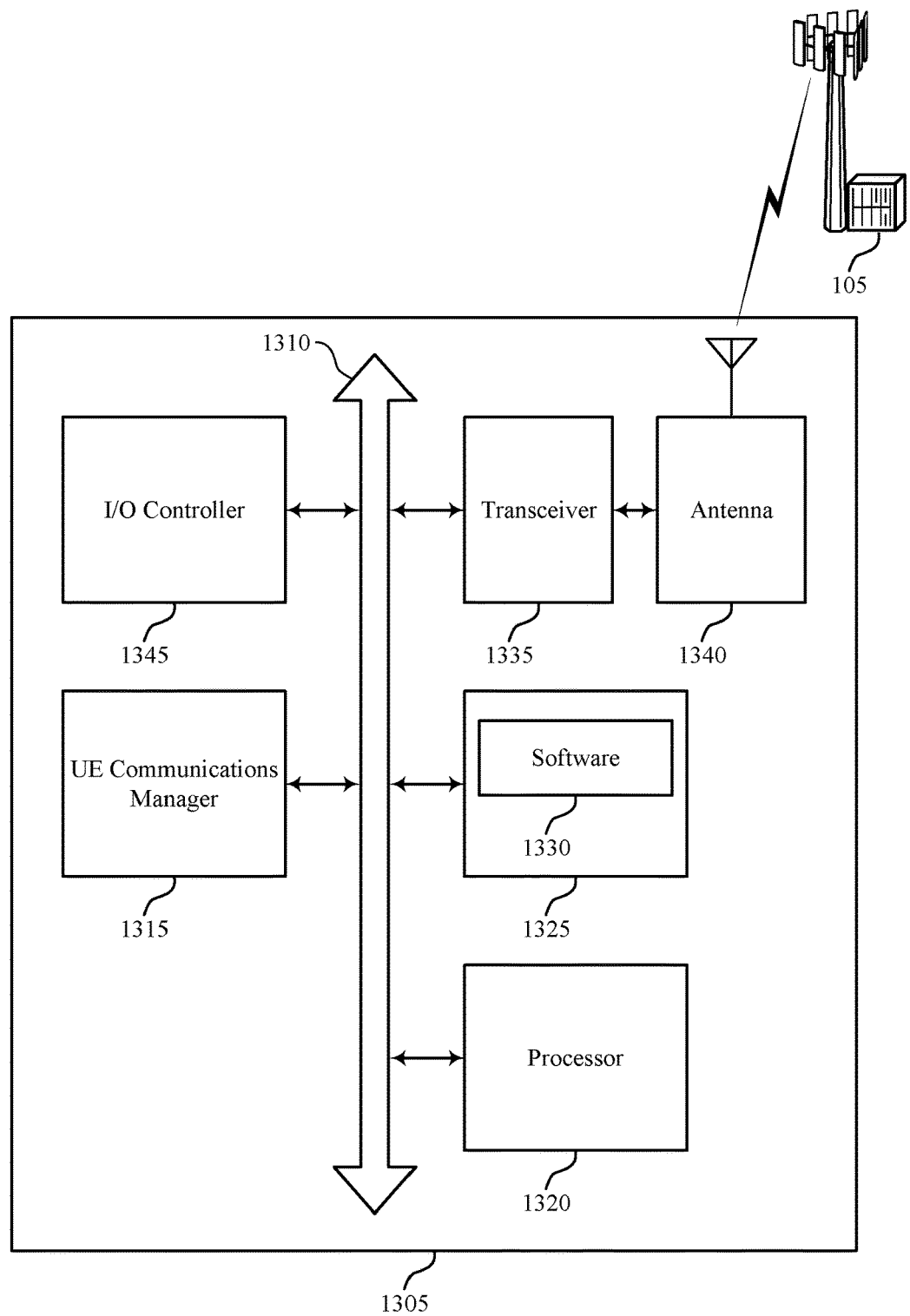
FIG. 13 illustrates a block diagram of a system including a UE that supports non-staggered reference signals and repeated pilots in OFDM in accordance with one or more aspects of the present disclosure.

FIG. 13 shows a diagram of a system 1300 including a device 1305 that supports non-staggered reference signals and repeated pilots in OFDM in accordance with one or more aspects of the present disclosure. Device 1305 may be an example of or include the components of UE 115 as described above, e.g., with reference to FIG. 1. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more busses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in memory to perform various functions (e.g., functions or tasks supporting non-staggered reference signals and repeated pilots in OFDM).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support non-staggered reference signals and repeated pilots in OFDM. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
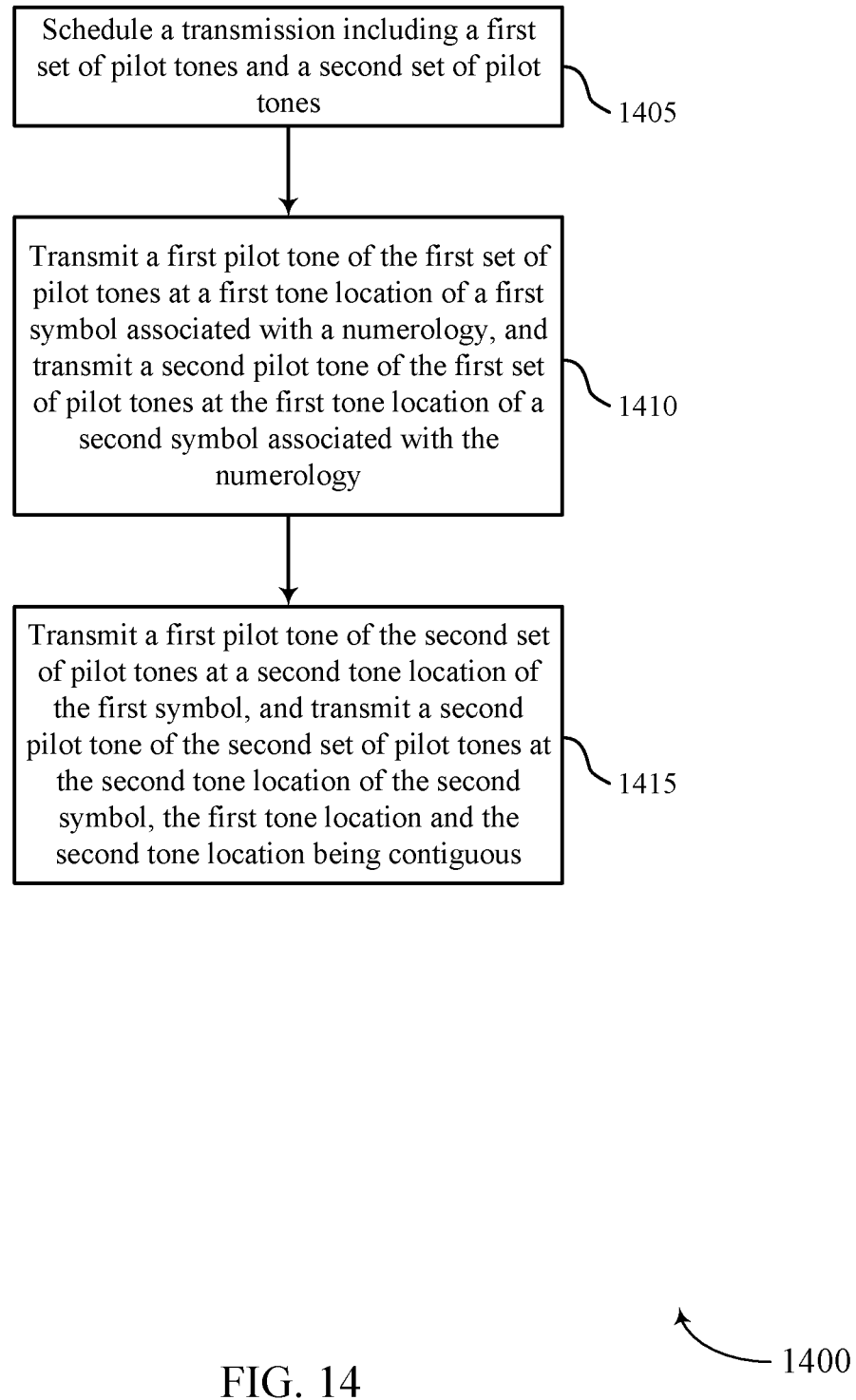
FIGS. 14 through 17 illustrate methods that support non-staggered reference signals and repeated pilots in OFDM in accordance with one or more aspects of the present disclosure.

FIG. 14 shows a flowchart illustrating a method 1400 that supports non-staggered reference signals and repeated pilots in OFDM in accordance with one or more aspects of the present disclosure. The operations of method 1400 may be implemented by a base station 105 or its components as described herein. For example, the operations of method 1400 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1405, the base station 105 may schedule a transmission comprising a first set of pilot tones and a second set of pilot tones. The operations of block 1405 may be performed according to the methods described with reference to FIGS. 1 through 5. In certain examples, aspects of the operations of block 1405 may be performed by a transmission scheduler as described with reference to FIGS. 6 through 9.

At block 1410, the base station 105 may transmit a first pilot tone of the first set of pilot tones at a first tone location of a first symbol associated with a numerology, and transmit a second pilot tone of the first set of pilot tones at the first tone location of a second symbol associated with the numerology. The operations of block 1410 may be performed according to the methods described with reference to FIGS. 1 through 5. In certain examples, aspects of the operations of block 1410 may be performed by a pilot tone manager as described with reference to FIGS. 6 through 9.

At block 1415, the base station 105 may transmit a first pilot tone of the second set of pilot tones at a second tone location of the first symbol, and transmit a second pilot tone of the second set of pilot tones at the second tone location of the second symbol, the first tone location and the second tone location being contiguous. The operations of block 1415 may be performed according to the methods described with reference to FIGS. 1 through 5. In certain examples, aspects of the operations of block 1415 may be performed by a pilot tone manager as described with reference to FIGS. 6 through 9.

Figure 15:
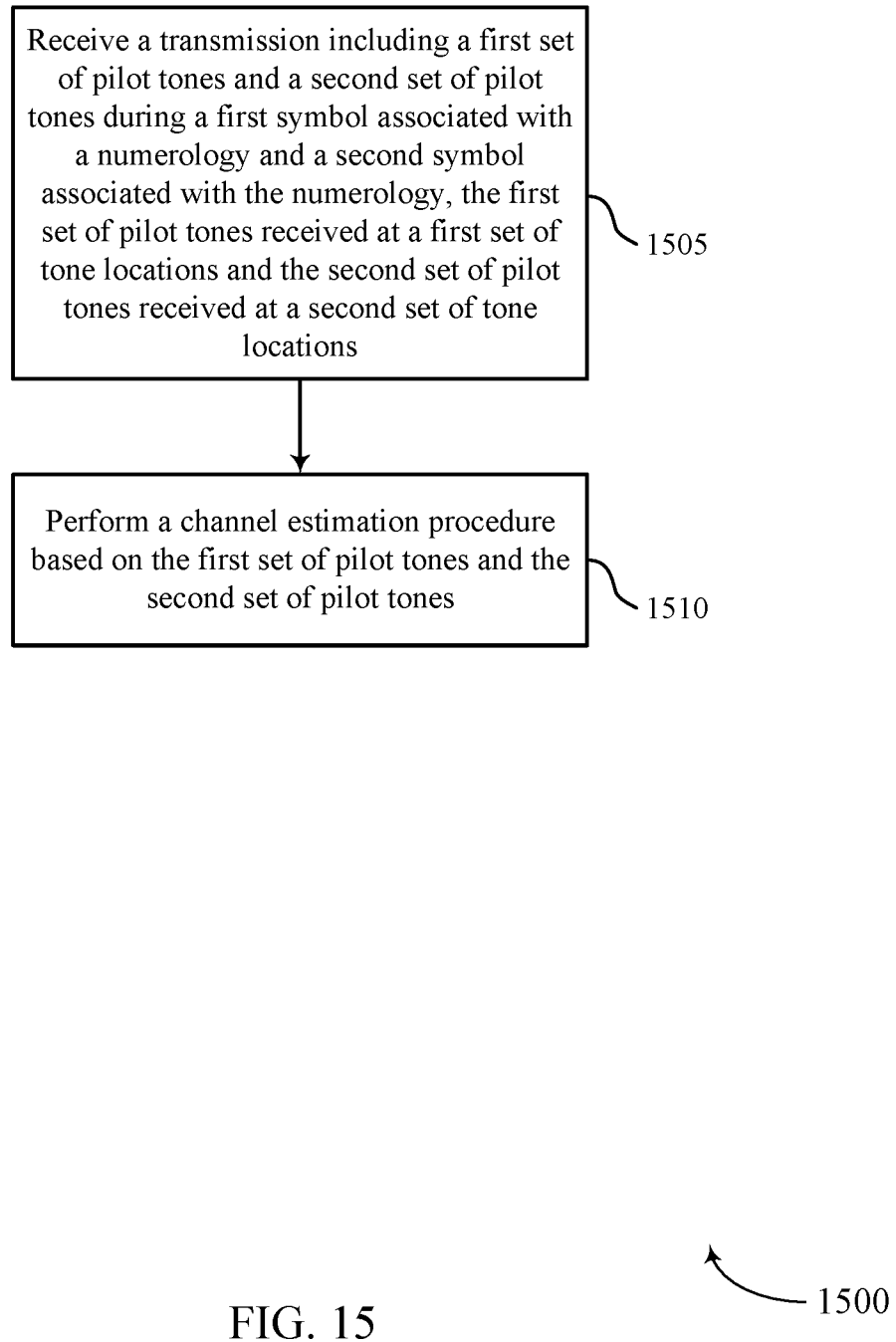

FIG. 15 shows a flowchart illustrating a method 1500 that supports non-staggered reference signals and repeated pilots in OFDM in accordance with one or more aspects of the present disclosure. The operations of method 1500 may be implemented by a UE 115 or its components as described herein. For example, the operations of method 1500 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may receive a transmission comprising a first set of pilot tones and a second set of pilot tones during a first symbol associated with a numerology and a second symbol associated with the numerology, the first set of pilot tones received at a first set of tone locations and the second set of pilot tones received at a second set of tone locations, wherein a combination of the first set of tone locations and the second set of tone locations comprises a contiguous set of tone locations. The operations of block 1505 may be performed according to the methods described with reference to FIGS. 1 through 5. In certain examples, aspects of the operations of block 1505 may be performed by a pilot tone manager as described with reference to FIGS. 10 through 13.

At block 1510, the UE 115 may perform a channel estimation procedure based at least in part on the first set of pilot tones and the second set of pilot tones. The operations of block 1510 may be performed according to the methods described with reference to FIGS. 1 through 5. In certain examples, aspects of the operations of block 1510 may be performed by a channel estimation manager as described with reference to FIGS. 10 through 13.

Figure 16:
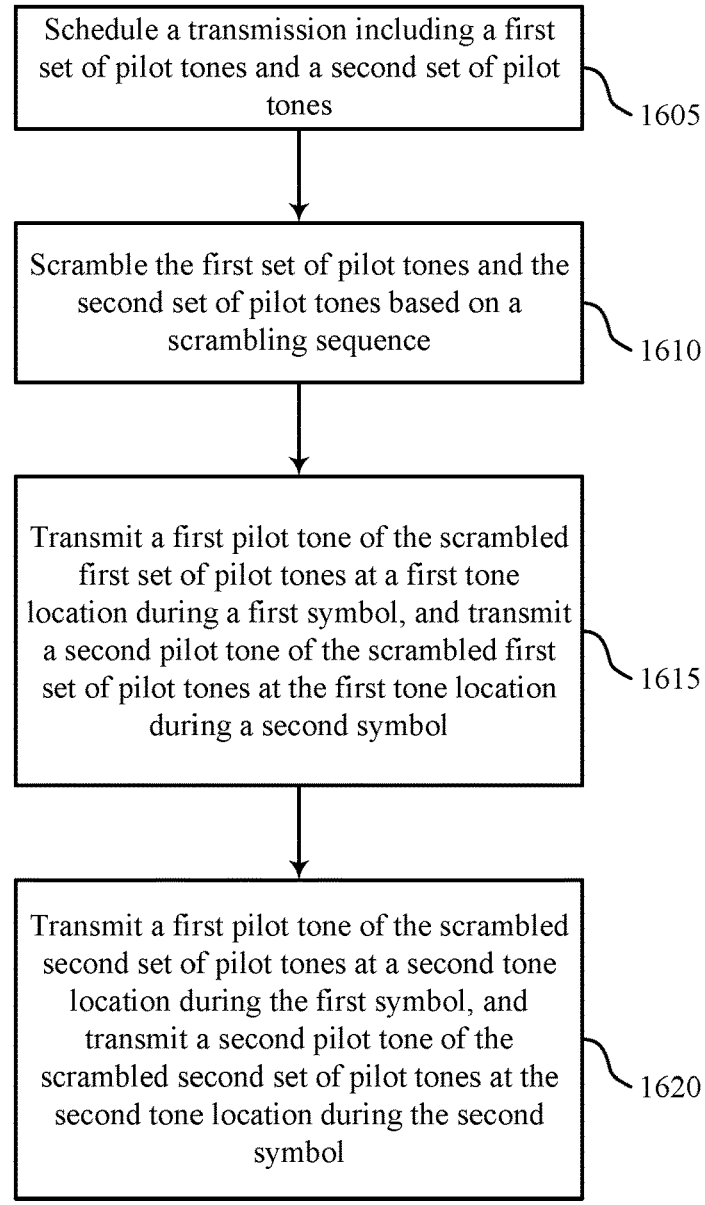

FIG. 16 shows a flowchart illustrating a method 1600 that supports non-staggered reference signals and repeated pilots in OFDM in accordance with one or more aspects of the present disclosure. The operations of method 1600 may be implemented by a base station 105 or its components as described herein. For example, the operations of method 1600 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1605, the base station 105 may schedule a transmission comprising a first set of pilot tones and a second set of pilot tones. The operations of block 1605 may be performed according to the methods described with reference to FIGS. 1 through 5. In certain examples, aspects of the operations of block 1605 may be performed by a transmission scheduler as described with reference to FIGS. 6 through 9.

At block 1610, the base station 105 may scramble the first set of pilot tones and the second set of pilot tones based at least in part on a scrambling sequence. The operations of block 1610 may be performed according to the methods described with reference to FIGS. 1 through 5. In certain examples, aspects of the operations of block 1610 may be performed by a pilot tone scrambler as described with reference to FIGS. 6 through 9.

At block 1615, the base station 105 may transmit a first pilot tone of the scrambled first set of pilot tones at a first tone location during a first symbol, and transmit a second pilot tone of the scrambled first set of pilot tones at the first tone location during a second symbol. The operations of block 1615 may be performed according to the methods described with reference to FIGS. 1 through 5. In certain examples, aspects of the operations of block 1615 may be performed by a pilot tone manager as described with reference to FIGS. 6 through 9.

At block 1620, the base station 105 may transmit a first pilot tone of the scrambled second set of pilot tones at a second tone location during the first symbol, and transmit a second pilot tone of the scrambled second set of pilot tones at the second tone location during the second symbol. The operations of block 1620 may be performed according to the methods described with reference to FIGS. 1 through 5. In certain examples, aspects of the operations of block 1620 may be performed by a pilot tone manager as described with reference to FIGS. 6 through 9.

Figure 17:
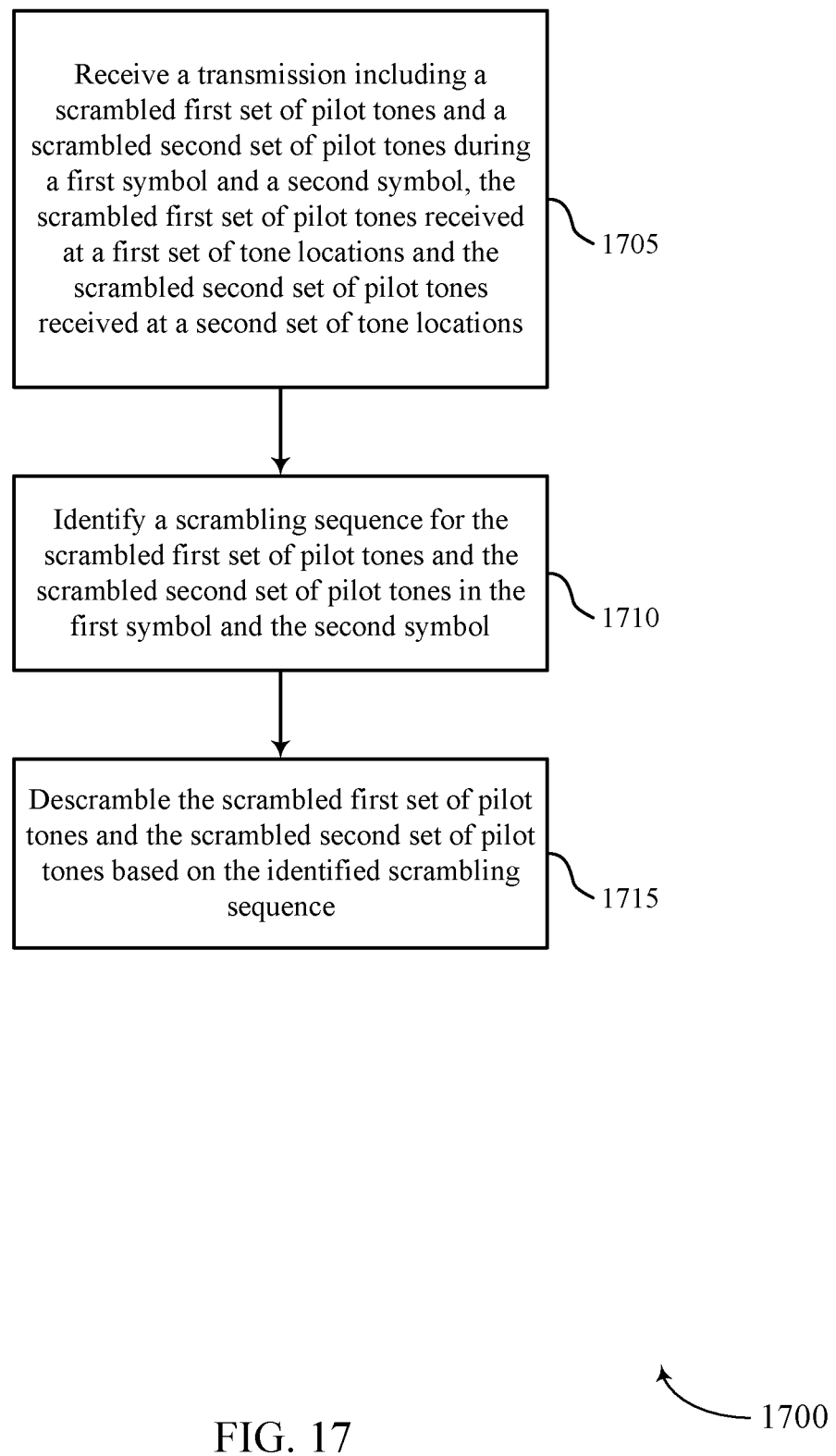

FIG. 17 shows a flowchart illustrating a method 1700 that supports non-staggered reference signals and repeated pilots in OFDM in accordance with one or more aspects of the present disclosure. The operations of method 1700 may be implemented by a UE 115 or its components as described herein. For example, the operations of method 1700 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1705, the UE 115 may receive a transmission comprising a scrambled first set of pilot tones and a scrambled second set of pilot tones during a first symbol and a second symbol, the scrambled first set of pilot tones received at a first set of tone locations and the scrambled second set of pilot tones received at a second set of tone locations. The operations of block 1705 may be performed according to the methods described with reference to FIGS. 1 through 5. In certain examples, aspects of the operations of block 1705 may be performed by a pilot tone manager as described with reference to FIGS. 10 through 13.

At block 1710, the UE 115 may identify a scrambling sequence for the scrambled first set of pilot tones and the scrambled second set of pilot tones in the first symbol and the second symbol. The operations of block 1710 may be performed according to the methods described with reference to FIGS. 1 through 5. In certain examples, aspects of the operations of block 1710 may be performed by a scrambling sequence identifier as described with reference to FIGS. 10 through 13.

At block 1715, the UE 115 may descramble the scrambled first set of pilot tones and the scrambled second set of pilot tones based at least in part on the identified scrambling sequence. The operations of block 1715 may be performed according to the methods described with reference to FIGS. 1 through 5. In certain examples, aspects of the operations of block 1715 may be performed by a pilot tone descrambler as described with reference to FIGS. 10 through 13.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, an eNB, a Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where discs usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   scheduling a transmission comprising a first set of pilot tones and a second set of pilot tones;
   transmitting a first pilot tone of the first set of pilot tones at a first tone location within a first symbol associated with a numerology, and transmitting a second pilot tone of the first set of pilot tones at a second tone location within a second symbol associated with the numerology; and
   transmitting a first pilot tone of the second set of pilot tones at a third tone location within the first symbol, and transmitting a second pilot tone of the second set of pilot tones at a fourth tone location within the second symbol, wherein the first tone location and the third tone location are contiguous within the first symbol, and the second tone location and the fourth tone location are contiguous within the second symbol.

2. The method of claim 1, further comprising:
   identifying a first scrambling sequence associated with the transmission during the first symbol and a second scrambling sequence associated with the transmission during the second symbol; and
   scrambling the first set of pilot tones and the second set of pilot tones within the first symbol based at least in part on the first scrambling sequence, and scrambling the first set of pilot tones and the second set of pilot tones within the second symbol based at least in part on the second scrambling sequence.

3. The method of claim 2, wherein the first scrambling sequence and the second scrambling sequence are the same or different.

4. The method of claim 1, wherein scheduling the transmission comprises:
   scheduling the transmission of the first set of pilot tones and the second set of pilot tones on a single antenna.

5. The method of claim 1, wherein scheduling the transmission comprises:
   scheduling the transmission of the first set of pilot tones on a first antenna and the second set of pilot tones on a second antenna.

6. The method of claim 1, wherein scheduling the transmission comprises:
   scheduling the transmission during the first symbol and the second symbol, wherein the first symbol and the second symbol are non-adjacent symbols.

7. The method of claim 1, wherein scheduling the transmission comprises:
   scheduling the transmission during the first symbol and the second symbol, wherein the first symbol and the second symbol are within a same resource block.

8. A method for wireless communication, comprising:
   receiving a transmission comprising a first set of pilot tones and a second set of pilot tones within a first symbol associated with a numerology and a second symbol associated with the numerology, the first set of pilot tones received at a first set of tone locations within the first symbol and the second symbol and the second set of pilot tones received at a second set of tone locations within the first symbol and the second symbol, wherein a first tone location from the first set of tone locations and a third tone location from the second set of tone locations comprise a first contiguous set of tone locations within the first symbol, and a second tone location from the first set of tone locations and a fourth tone location from the second set of tone locations comprise a second contiguous set of tone locations within the second symbol; and performing a channel estimation procedure based at least in part on the first set of pilot tones and the second set of pilot tones.

9. The method of claim 8, further comprising:
identifying a first scrambling sequence associated with the transmission during the first symbol and a second scrambling sequence associated with the transmission during the second symbol; and
descrambling the first set of pilot tones and the second set of pilot tones within the first symbol based at least in part on the first scrambling sequence, and descrambling the first set of pilot tones and the second set of pilot tones within the second symbol based at least in part on the second scrambling sequence.

10. The method of claim 9, wherein the first scrambling sequence and the second scrambling sequence are the same or different.

11. The method of claim 8, wherein receiving the transmission comprises:
receiving the transmission of the first set of pilot tones and the second set of pilot tones from a single transmit antenna.

12. The method of claim 8, wherein receiving the transmission comprises:
receiving the transmission of the first set of pilot tones from a first transmit antenna, and receiving the transmission of the second set of pilot tones from a second transmit antenna.

13. The method of claim 8, wherein receiving the transmission comprises:
receiving the transmission during the first symbol and the second symbol, wherein the first symbol and the second symbol are non-adjacent symbols.

14. The method of claim 8, wherein receiving the transmission comprises:
receiving the transmission during the first symbol and the second symbol, wherein the first symbol and the second symbol are within a same resource block.

15. A method for wireless communication, comprising:
scheduling a transmission comprising a first set of pilot tones and a second set of pilot tones;
scrambling the first set of pilot tones and the second set of pilot tones based at least in part on a scrambling sequence;
transmitting a first pilot tone of the scrambled first set of pilot tones at a first tone location within a first symbol, and transmitting a second pilot tone of the scrambled first set of pilot tones at a second tone location within a second symbol, the first symbol and the second symbol being non-adjacent symbols; and
transmitting a first pilot tone of the scrambled second set of pilot tones at a third tone location within the first symbol, and transmitting a second pilot tone of the scrambled second set of pilot tones at a fourth tone location within the second symbol.

16. The method of claim 15, wherein the first tone location, the third tone location, the second tone location, and the fourth tone are contiguous or non-contiguous.

17. The method of claim 15, wherein scheduling the transmission comprises:
scheduling the transmission of the first set of pilot tones and the second set of pilot tones on a single antenna.

18. The method of claim 15, wherein scheduling the transmission comprises:
scheduling the transmission of the first set of pilot tones on a first antenna and the second set of pilot tones on a second antenna.

19. The method of claim 15, wherein scheduling the transmission comprises:
scheduling the transmission during the first symbol and the second symbol.

20. The method of claim 15, wherein scheduling the transmission comprises:
scheduling the transmission during the first symbol and the second symbol, wherein the first symbol and the second symbol are within a same resource block.

21. A method for wireless communication, comprising:
receiving a transmission comprising a scrambled first set of pilot tones and a scrambled second set of pilot tones within a first symbol and a second symbol, the first symbol and the second symbol being non-adjacent symbols, the scrambled first set of pilot tones received at a first set of tone locations within the first symbol and the second symbol, and the scrambled second set of pilot tones received at a second set of tone locations within the first symbol and the second symbol;
identifying a scrambling sequence for the scrambled first set of pilot tones and the scrambled second set of pilot tones in the first symbol and the second symbol; and
descrambling the scrambled first set of pilot tones and the scrambled second set of pilot tones based at least in part on the identified scrambling sequence.

22. The method of claim 21, further comprising:
performing a channel estimation procedure based at least in part on the descrambled first set of pilot tones and the descrambled second set of pilot tones.

23. The method of claim 21, further comprising:
performing a channel estimation procedure based at least in part on the scrambled first set of pilot tones and the scrambled second set of pilot tones.

24. The method of claim 21, wherein a combination of the first set of tone locations and the second set of tone locations comprises a contiguous set of tone locations or a non-contiguous set of tone locations.

25. The method of claim 21, wherein receiving the transmission comprises:
receiving the transmission of the scrambled first set of pilot tones and the scrambled second set of pilot tones from a single transmit antenna.

26. The method of claim 21, wherein receiving the transmission comprises:
receiving the transmission of the scrambled first set of pilot tones from a first transmit antenna, and receiving the transmission of the scrambled second set of pilot tones from a second transmit antenna.

27. The method of claim 21, wherein receiving the transmission comprises:
receiving the transmission during the first symbol and the second symbol.

28. The method of claim 21, wherein receiving the transmission comprises:
   receiving the transmission during the first symbol and the second symbol, wherein the first symbol and the second symbol are within a same resource block.

\* \* \* \* \*